United States Patent
Cha et al.

(10) Patent No.: US 11,924,128 B2
(45) Date of Patent: Mar. 5, 2024

(54) METHOD FOR TRANSMITTING REFERENCE SIGNAL IN WIRELESS COMMUNICATION SYSTEM, AND APPARATUS THEREFOR

(71) Applicant: LG ELECTRONICS INC., Seoul (KR)

(72) Inventors: Hyunsu Cha, Seoul (KR); Jiwon Kang, Seoul (KR); Jonghyun Park, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 382 days.

(21) Appl. No.: 17/290,432

(22) PCT Filed: Nov. 4, 2019

(86) PCT No.: PCT/KR2019/014867
§ 371 (c)(1),
(2) Date: Apr. 30, 2021

(87) PCT Pub. No.: WO2020/091577
PCT Pub. Date: May 7, 2020

(65) Prior Publication Data
US 2021/0385039 A1    Dec. 9, 2021

Related U.S. Application Data

(60) Provisional application No. 62/755,274, filed on Nov. 2, 2018.

(51) Int. Cl.
*H04L 5/00* (2006.01)
*H04J 13/00* (2011.01)
(Continued)

(52) U.S. Cl.
CPC .......... *H04L 5/0048* (2013.01); *H04J 13/004* (2013.01); *H04W 8/22* (2013.01); *H04W 72/21* (2023.01); *H04W 72/51* (2023.01)

(58) Field of Classification Search
CPC ....... H04W 8/22; H04W 72/51; H04W 72/21; H04J 13/004
See application file for complete search history.

(56) References Cited

U.S. PATENT DOCUMENTS

2011/0237267 A1    9/2011   Chen et al.
2014/0036737 A1    2/2014   Ekpenyong et al.
(Continued)

FOREIGN PATENT DOCUMENTS

WO    WO2013147430    10/2013

OTHER PUBLICATIONS

R1-1810555 CATT "Considerations on multi-TRP/panel transmission for Rel-16" 3GPP WG1 #94bis Chengdu Oct. 8-12, 2018 (Year: 2018).*

(Continued)

*Primary Examiner* — Basil Ma
(74) *Attorney, Agent, or Firm* — Fish & Richardson P.C.

(57) ABSTRACT

The present specification relates to a method and apparatus for transmitting a reference signal in a wireless communication system. According to this specification, in a method for transmitting a reference signal in a wireless communication system, a method performed by a base station comprises: transmitting, to a terminal, control information including panel identification information related to identification of a plurality of antenna panels used for transmission of the reference signal, wherein a reference signal sequence used to generate the reference signal is initialized based on the panel identification information by the terminal; and receiving, from the terminal, the reference signal (Continued)

generated based on the initialized reference signal sequence by the terminal.

17 Claims, 12 Drawing Sheets

(51) Int. Cl.
*H04W 8/22* (2009.01)
*H04W 72/21* (2023.01)
*H04W 72/51* (2023.01)

(56) References Cited

U.S. PATENT DOCUMENTS

| 2018/0123850 | A1 | 5/2018 | Zarifi et al. | |
|---|---|---|---|---|
| 2021/0167821 | A1* | 6/2021 | Chen | H04B 7/0617 |
| 2021/0297959 | A1* | 9/2021 | Zhou | H04W 76/28 |

OTHER PUBLICATIONS

CATT, "Considerations on multi-TRP/panel transmission for Rel-16," R1-1810555, 3GPP TSG RAN WG1 Meeting #94bis, Chengdu, China, Oct. 8-12, 2018, 10 pages.
PCT International Search Report in International Appln. No. PCT/KR2019/014867, dated Feb. 20, 2020, 5 pages (with English translation).

* cited by examiner

[FIG. 1]
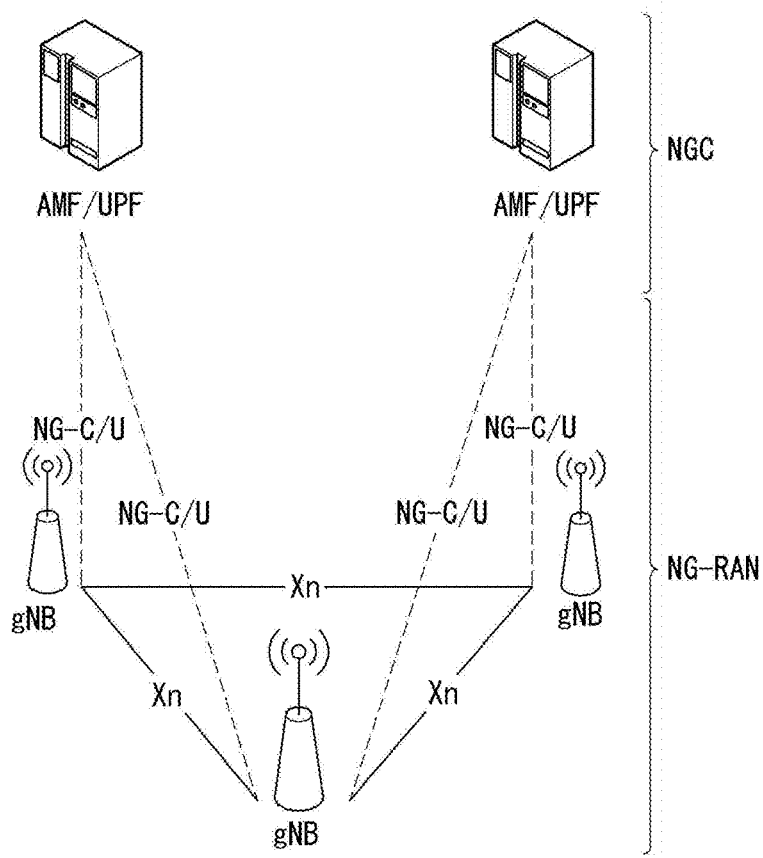
[FIG. 2]
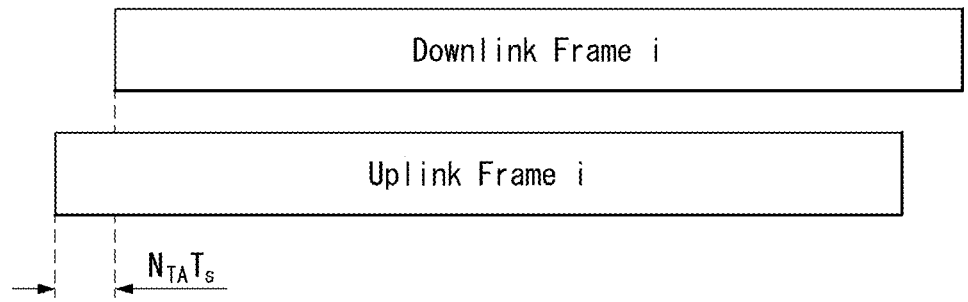

[FIG. 3]
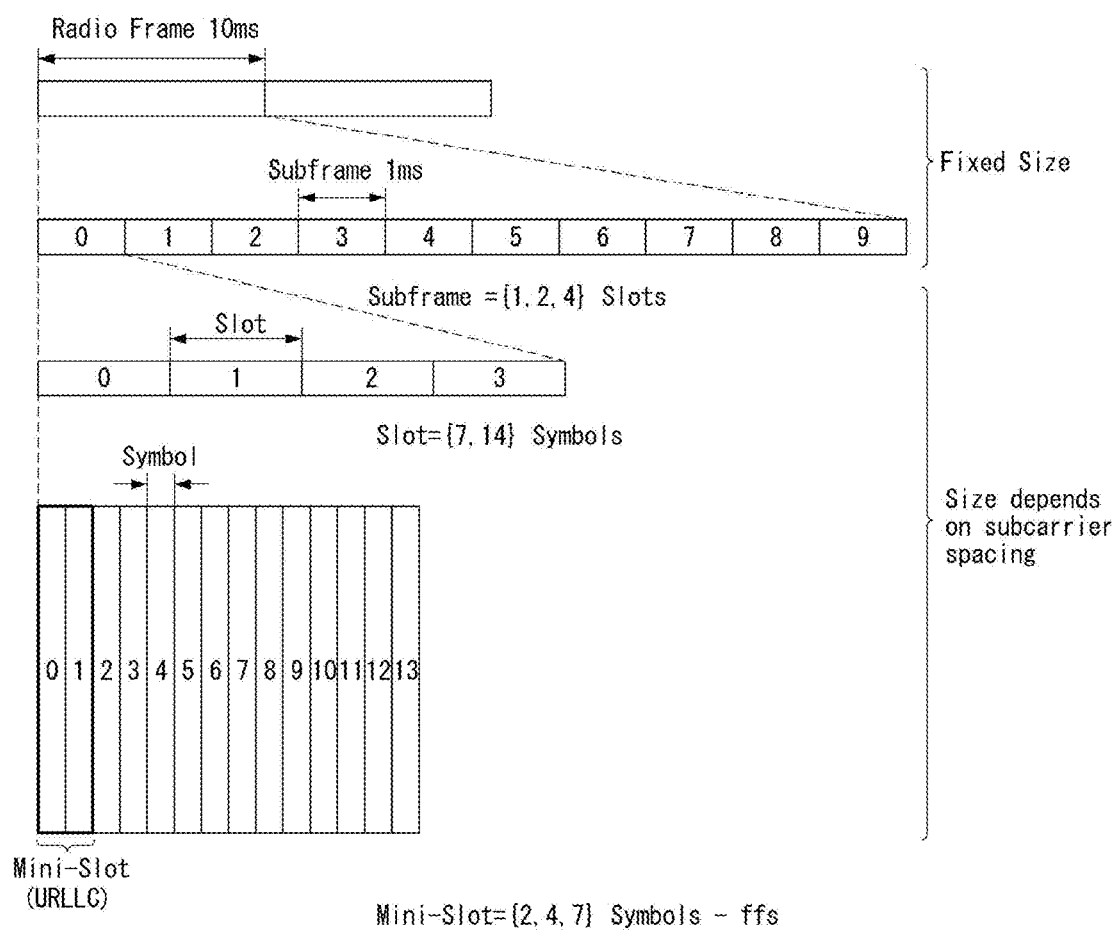

[FIG. 4]
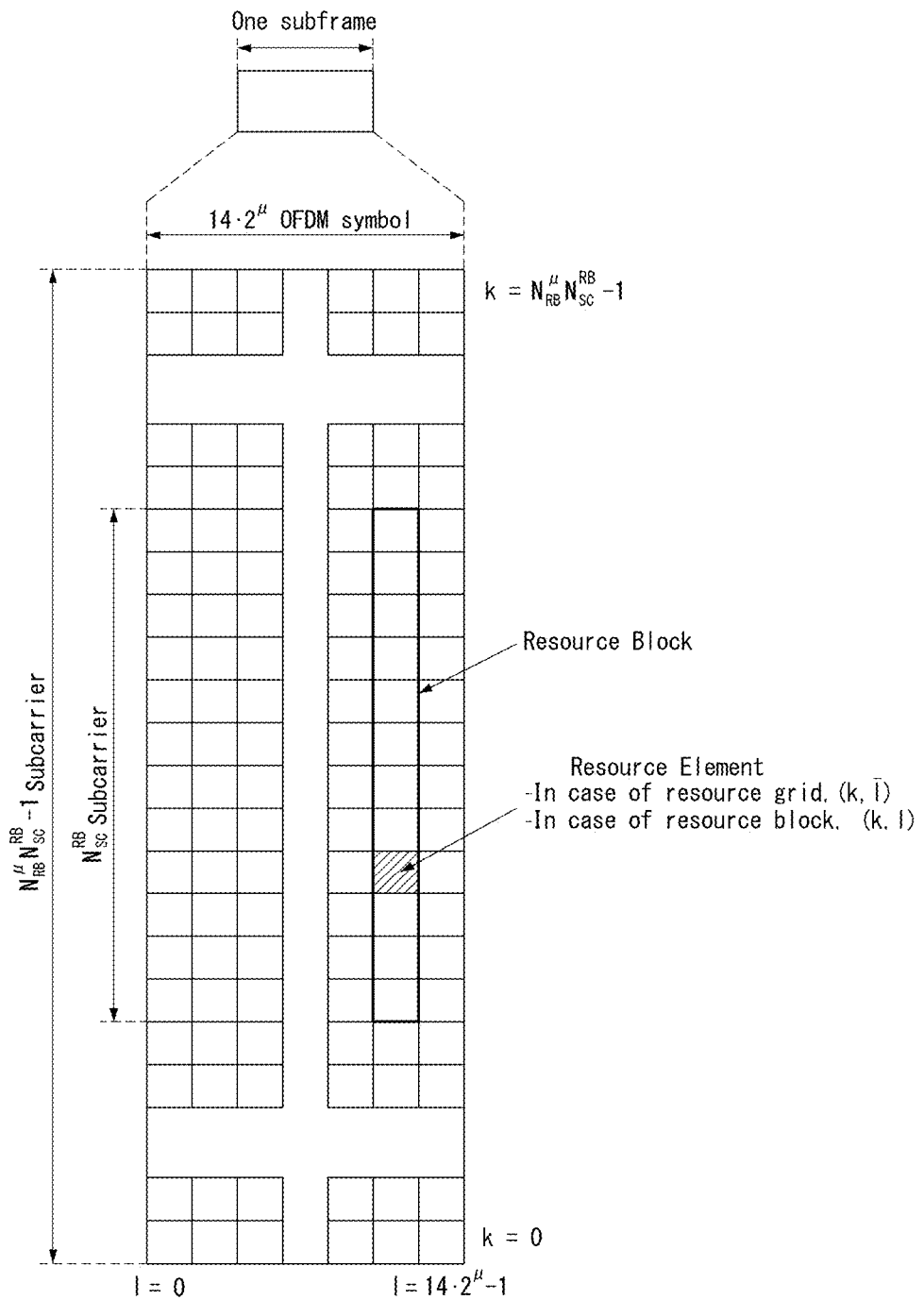

[FIG. 5]
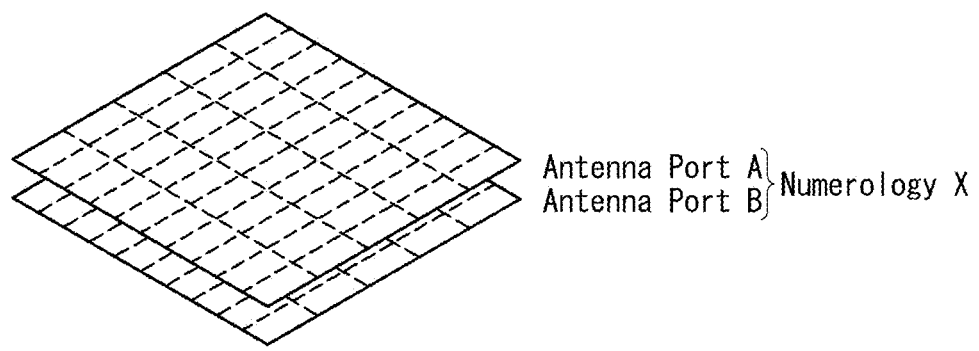
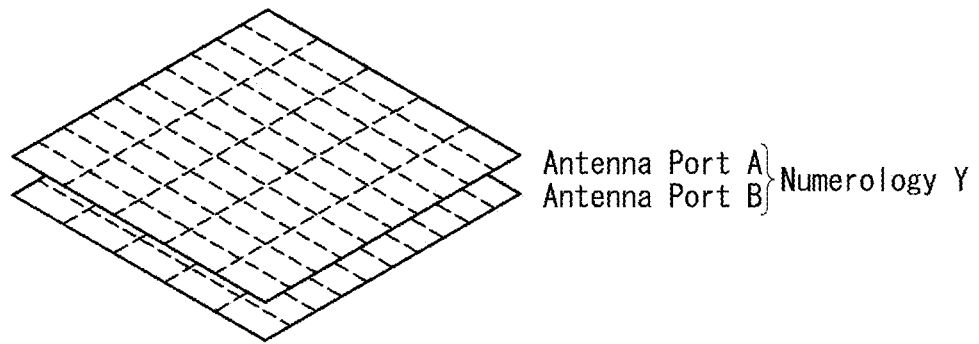

[FIG. 6]
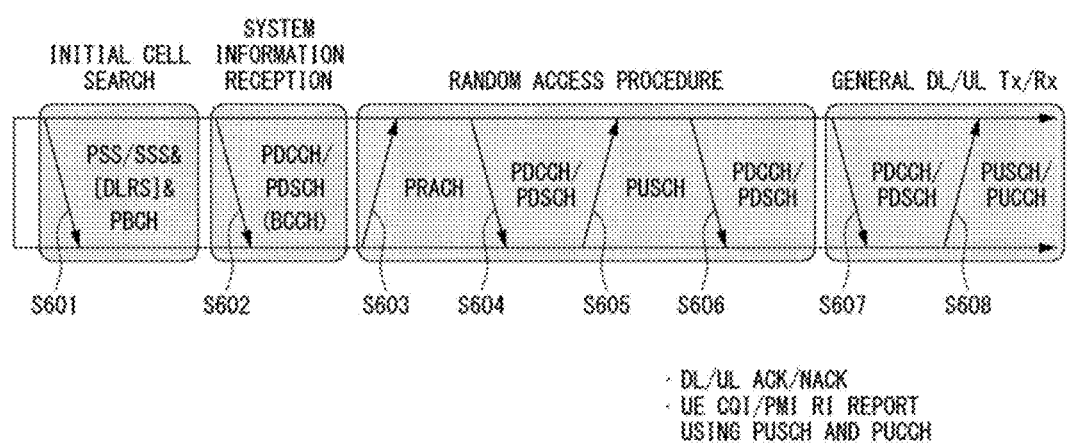

[FIG. 7]
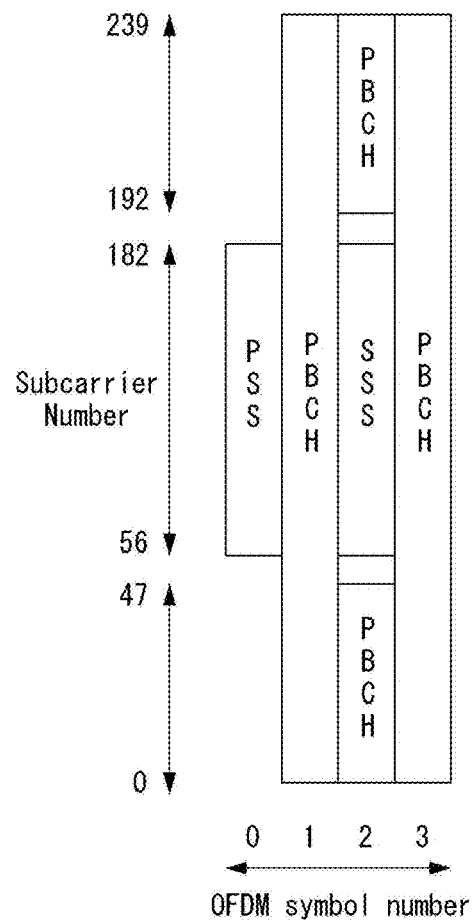
[FIG. 8]
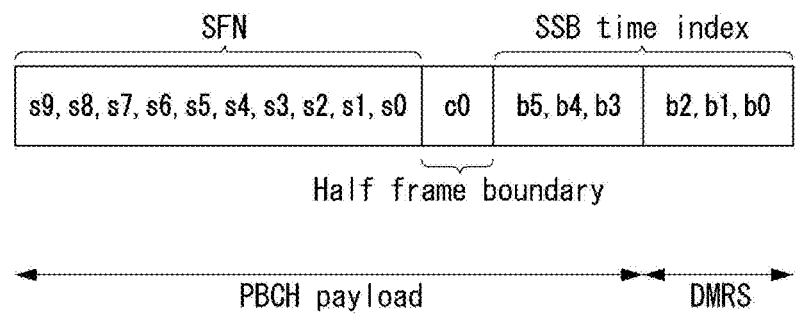

[FIG. 9]
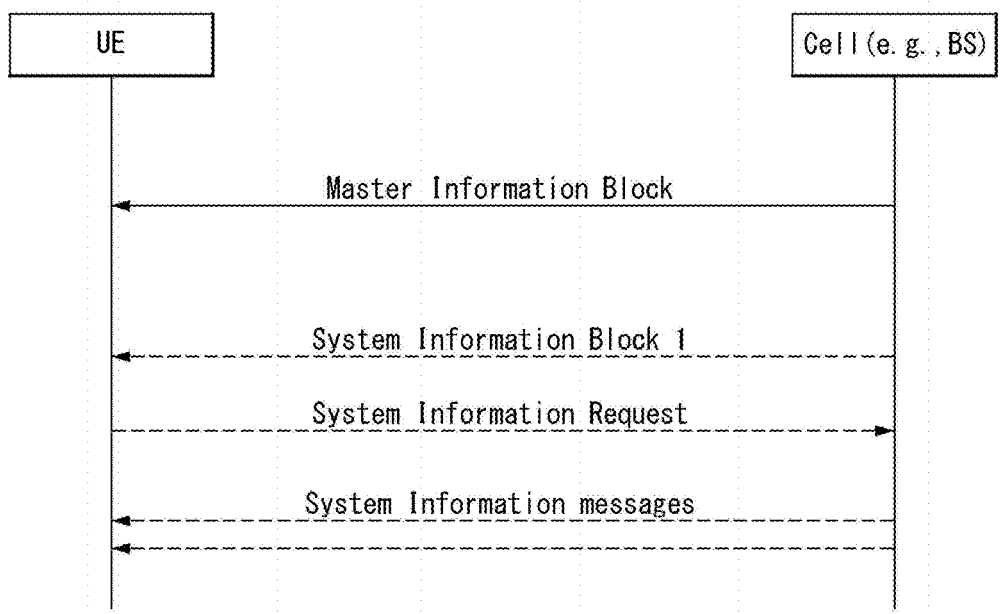
[FIG. 10]
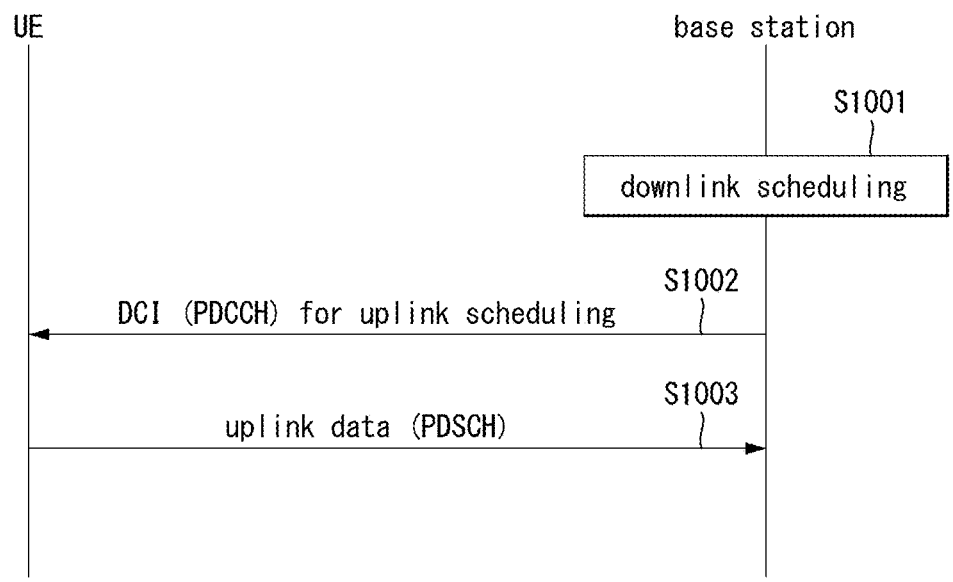

[FIG. 11]
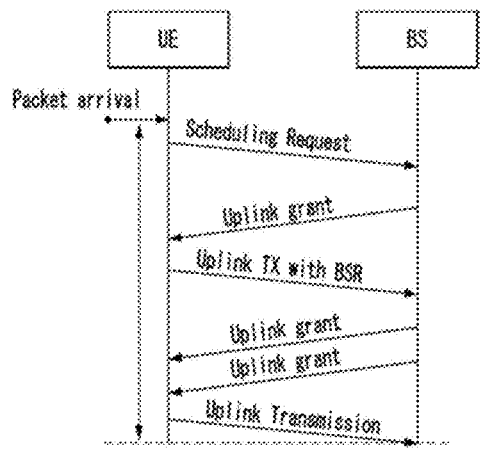
Fig. Uplink TX procedure with grant
(a)
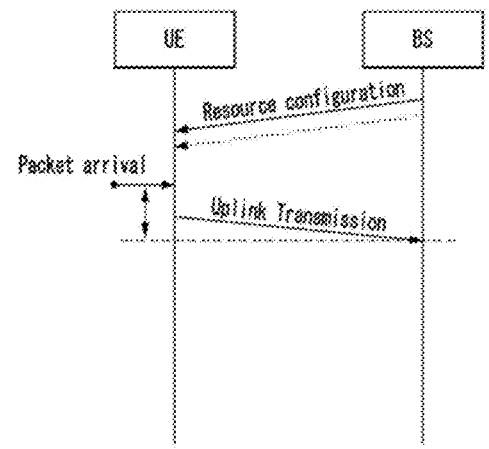
Fig. Uplink TX procedure without grant
(b)

[FIG. 12]
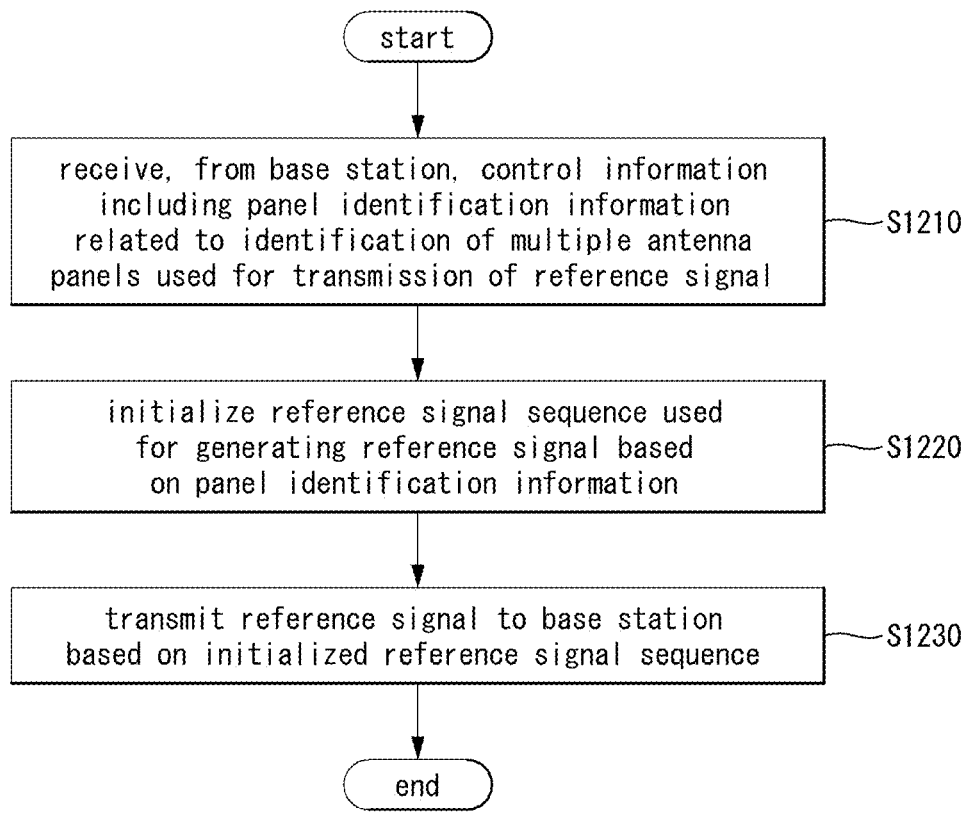

[FIG. 13]
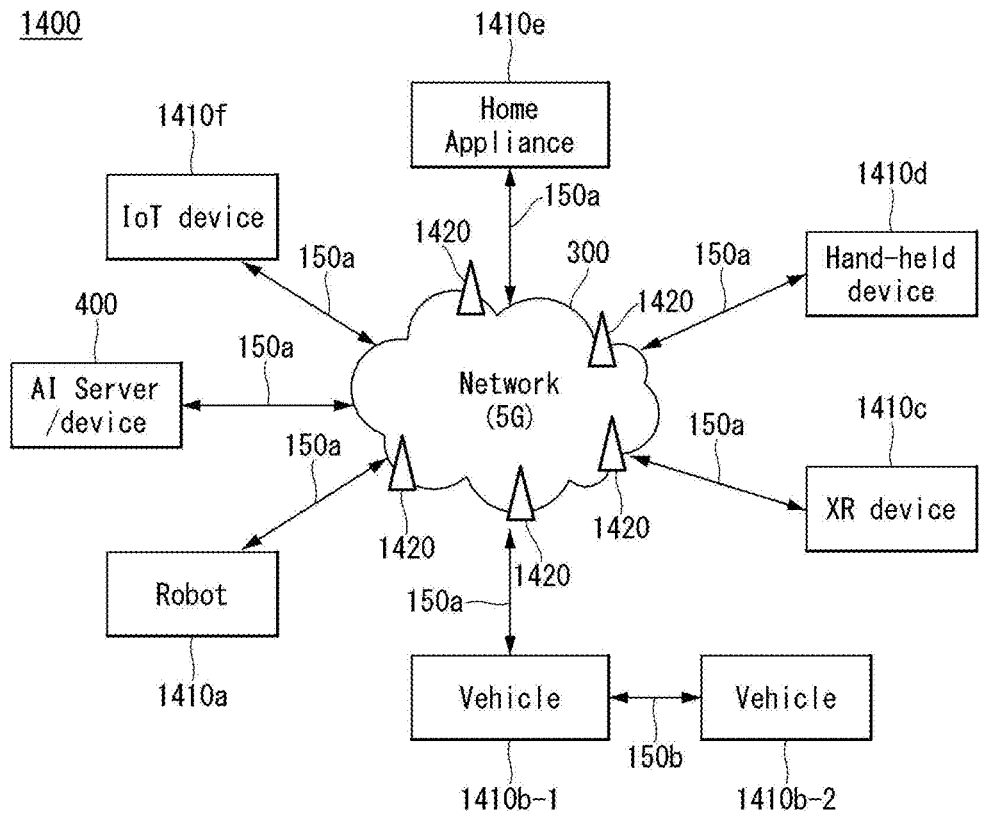
[FIG. 14]
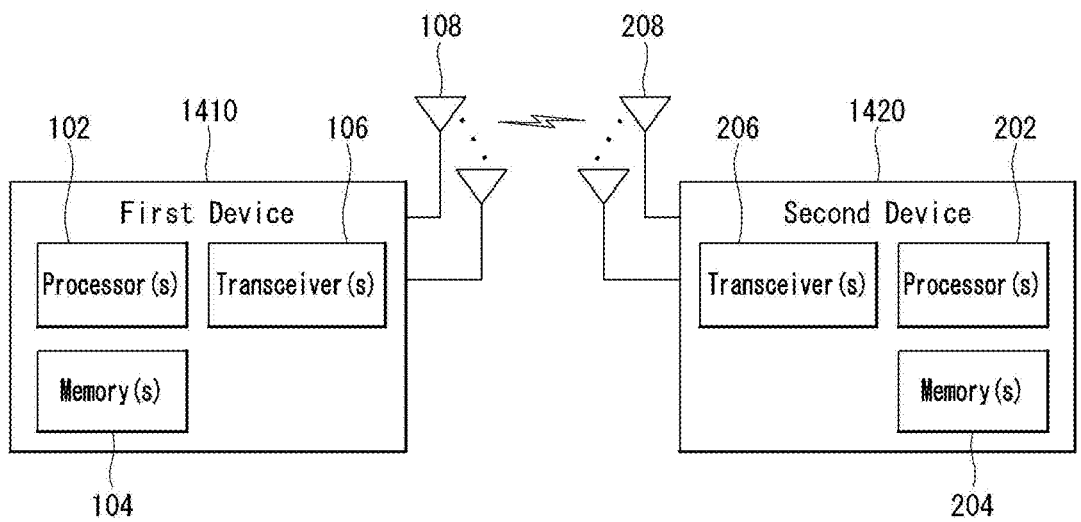

[FIG. 15]
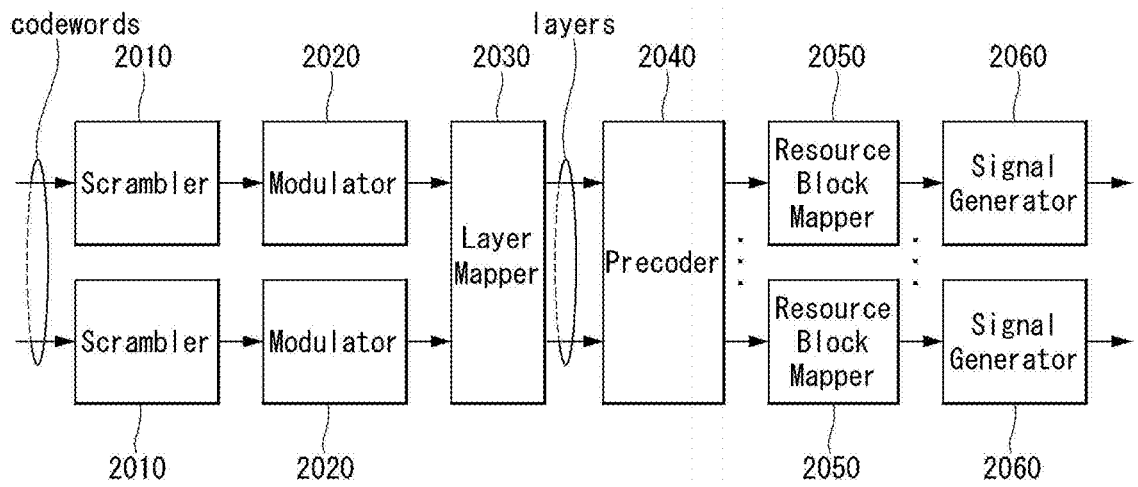
[FIG. 16]
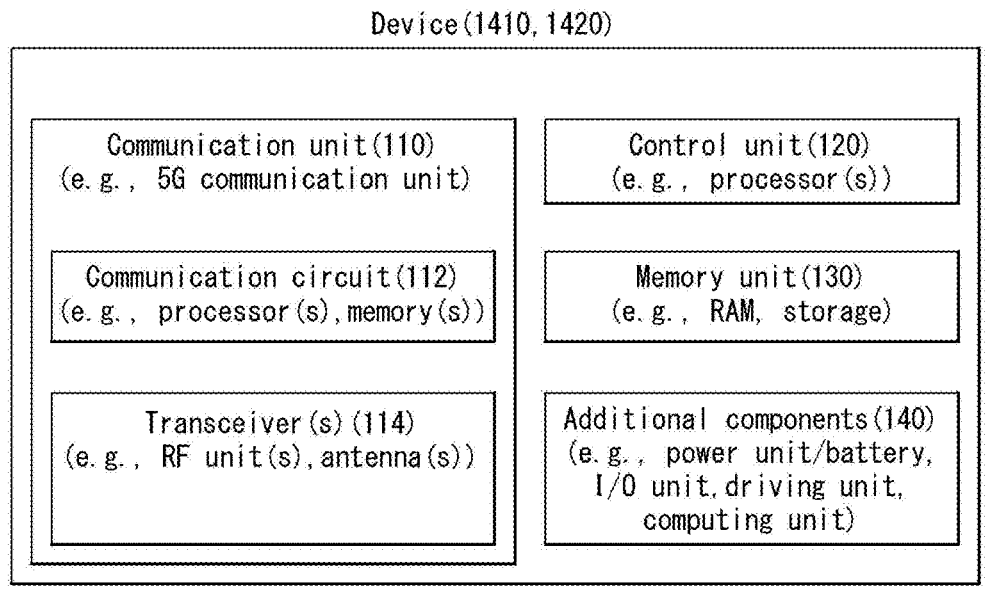

[FIG. 17]
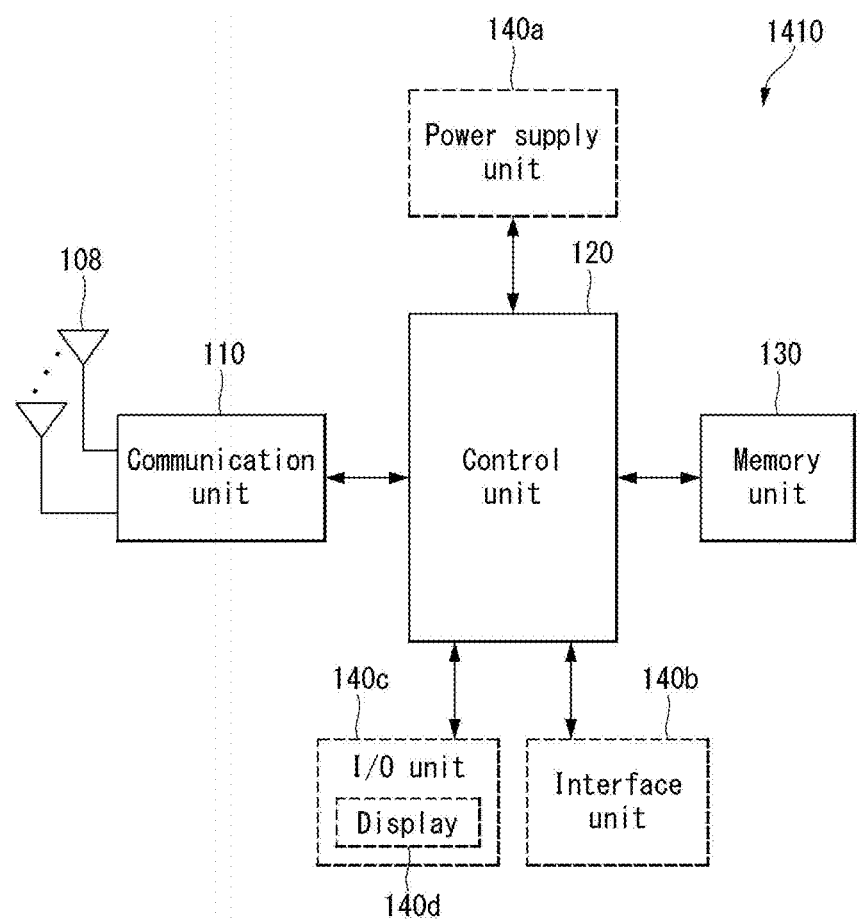

METHOD FOR TRANSMITTING REFERENCE SIGNAL IN WIRELESS COMMUNICATION SYSTEM, AND APPARATUS THEREFOR

CROSS-REFERENCE TO RELATED APPLICATIONS

This application is a National Stage application under 35 U.S.C. § 371 of International Application No. PCT/KR2019/014867, filed on Nov. 4, 2019, which claims the benefit of earlier filing date and right of priority to U.S. Provisional Application No. 62/755,274, filed on Nov. 2, 2018, the contents of which are all hereby incorporated by reference herein in their entirety.

TECHNICAL FIELD

The disclosure relates to a wireless communication system, and more particularly, to a method and device for initializing a reference signal sequence for reference signal transmission.

BACKGROUND ART

A mobile communication system has been developed to provide a voice service while ensuring the activity of a user. However, the area of the mobile communication system has extended to a data service in addition to a voice. Due to the current explosive increase in traffic, there is a shortage of resources, and thus users demand a higher speed service. Accordingly, there is a need for a more advanced mobile communication system.

Requirements for a next-generation mobile communication system need to be able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), super wideband support, and device networking, are researched.

DISCLOSURE

Technical Problem

An object of the disclosure is to provide a method and device for transmitting a reference signal by a UE/base station equipped with a multi-antenna panel.

Further, an object of the disclosure is to provide a method and device for initializing a reference signal sequence for transmitting a reference signal.

Further, an object of the disclosure is to provide a method and device for reducing signaling overhead required for resource allocation for an antenna panel to transmit a reference signal.

Further, an object of the disclosure is to provide a method and device for initializing a reference signal sequence for transmitting a reference signal based on panel identification information for identifying a plurality of antenna panels.

Further, an object of the disclosure is to provide a method and device for initializing a reference signal sequence for transmitting a reference signal based on an antenna panel identifier and a code division multiplexing group index.

Objects of the disclosure are not limited to the foregoing, and other unmentioned objects would be apparent to one of ordinary skill in the art from the following description.

Technical Solution

The disclosure provides a method and apparatus for transmitting a reference signal in a wireless communication system.

More specifically, in the disclosure, in a method of transmitting a reference signal in a wireless communication system, a method performed by a terminal comprises, receiving, from a base station, control information including panel identification information related to identification of a plurality of antenna panels used for transmission of the reference signal; initializing a reference signal sequence used to generate the reference signal based on the panel identification information; and transmitting the reference signal to the base station based on the initialized reference signal sequence.

Furthermore, in the disclosure, wherein the reference signal is one of a sounding reference signal (SRS), a physical uplink control channel dedicated demodulation reference signal (PUCCH DM-RS), a physical uplink shared channel (PUSCH) DM-RS or a Positioning Reference Signal (PRS).

Furthermore, in the disclosure, wherein the panel identification information includes at least one of a panel index for the plurality of antenna panels, a reference signal set identifier (ID), or a reference signal resource ID for a resource through which the reference signal is transmitted, and wherein each of the plurality of antenna panels comprises a plurality of antenna ports.

Furthermore, in the disclosure, wherein the reference signal sequence is initialized by further using a code division multiplexing (CDM) group index.

Furthermore, in the disclosure, wherein when transmitting a plurality of reference signals through the plurality of antenna panels, same scrambling sequence identifier (ID) is set to initialize each reference signal sequence for the plurality of reference signals, wherein each of the reference signal sequences is initialized to a different initialization sequence value based on the panel identification information.

Furthermore, in the disclosure, wherein an antenna panel transmitting a specific reference signal among the plurality of reference signals is identified based on the panel identification information.

Furthermore, in the disclosure, wherein an uplink resource through which the reference signal is transmitted is shared between the plurality of antenna panels.

Furthermore, in the disclosure, further comprises, transmitting capability information related to the plurality of antenna panels to the base station.

Furthermore, in the disclosure, further comprises, receiving resource information for transmission of the reference signal from the base station.

Furthermore, in the disclosure, in a method for transmitting a reference signal in a wireless communication system, a method performed by a base station, comprises, transmitting, to a terminal, control information including panel identification information related to identification of a plurality of antenna panels used for transmission of the reference signal, wherein a reference signal sequence used to generate the reference signal is initialized based on the panel identification information by the terminal; and receiving, from the terminal, the reference signal generated based on the initialized reference signal sequence by the terminal.

Furthermore, in the disclosure, a terminal for transmitting a reference signal in a wireless communication system, comprises, a transmitter for transmitting a radio signal; a receiver for receiving a radio signal; and a processor functionally connected to the transmitter and the receiver, wherein the processor controls: the receiver to receiving, from a base station, control information including panel identification information related to identification of a plurality of antenna panels used for transmission of the reference signal, to initialize a reference signal sequence used to generate the reference signal based on the panel identification information, and the transmitter to transmit the reference signal to the base station based on the initialized reference signal sequence.

Advantageous Effects

The disclosure has an effect that a UE/base station equipped with a multi-antenna panel may transmit a reference signal.

Further, the disclosure has an effect of being able to initialize a reference signal sequence for transmitting a reference signal.

Further, the disclosure has an effect of reducing signaling overhead required for resource allocation for the antenna panel to transmit a reference signal.

Further, the disclosure has an effect of being able to initialize a reference signal sequence for transmitting a reference signal based on panel identification information for identifying a plurality of antenna panels.

Further, the disclosure has an effect of being able to initialize a reference signal sequence for transmitting a reference signal based on an antenna panel identifier and a code division multiplexing group index.

Effects of the disclosure are not limited to the foregoing, and other unmentioned effects would be apparent to one of ordinary skill in the art from the following description.

DESCRIPTION OF DRAWINGS

The accompanying drawings, which are included to provide a further understanding of the disclosure and constitute a part of the detailed description, illustrate embodiments of the disclosure and together with the description serve to explain the principle of the disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission used in a 3GPP system.

FIG. 7 illustrates an example of SSB transmission to which a method proposed in the disclosure may be applied.

FIG. 8 is a view illustrating an example of obtaining information regarding downlink (DL) time synchronization by a UE to which a method proposed in the disclosure may be applied.

FIG. 9 is a view illustrating an example of obtaining system information (SI) by a UE to which a method proposed in the disclosure may be applied.

FIG. 10 is a view illustrating an example of uplink transmission/reception to which a method proposed in the disclosure may be applied.

FIG. 11 is a view illustrating an example uplink grant.

FIG. 12 is a view illustrating an example operation implemented in a UE for performing a method for transmitting a reference signal in a wireless communication system proposed in the disclosure.

FIG. 13 illustrates a communication system applied to the disclosure.

FIG. 14 illustrates a wireless device applicable to the disclosure.

FIG. 15 illustrates a signal processing circuit for a transmission signal.

FIG. 16 illustrates another example of a wireless device applied to the disclosure.

FIG. 17 illustrates a portable device applied to the disclosure.

MODE FOR DISCLOSURE

A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), AR (Augmented Reality) device, VR (Virtual Reality) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, an Unmanned Aerial Vehicle (UAV), AR (Augmented Reality) device, VR (Virtual Reality) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA14200. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the disclosure may be referred to for a background art, terms, abbreviations, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billion. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of megabits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of an NR system to which a method proposed in the disclosure is applicable.

Referring to FIG. 1, an NG-RAN is configured with an NG-RA user plane (new AS sublayer/PDCP/RLC/MAC/PHY) and gNBs which provide a control plane (RRC) protocol end for a user equipment (UE).

The gNBs are interconnected through an Xn interface.

The gNBs are also connected to an NGC through an NG interface.

More specifically the gNBs are connected to an access and mobility management function (AMF) through an N2 interface and to a user plane function (UPF) through an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | Δf = $2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

NR supports multiple numerology (or subcarrier spacing (SCS)) to support various 5G services. For example, when the SCS is 15 kHz, it supports a wide area in traditional cellular bands, and when the SCS is 30 kHz/60 kHz, it is dense-urban, lower latency. And supports a wider carrier bandwidth (wider carrier bandwidth), and when the SCS is 60 kHz or higher, a bandwidth greater than 24.25 GHz is supported to overcome phase noise.

the NR frequency band is defined as a frequency range of two types (FR1, FR2). FR1 is a sub 6 GHz range, and FR2 may mean a millimeter wave (mmW) in the above 6 GHz range.

Table 2 below shows the definition of the NR frequency band.

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f / 100) \cdot T_s = 10$ ms. The radio frame is composed of ten subframes each having a section of $T_{sf} = (\Delta f_{max} N_f / 1000) \cdot T_s = 1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $n_s^\mu \in \{0, \ldots, N_{subframe}^{slots,\mu} - 1\}$ within a subframe and are numbered in increasing order of $n_{s,f}^\mu \in \{0, \ldots, N_{frame}^{slots,\mu} - 1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 3 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4 in case of μ=2, i.e., as an example in which a subcarrier spacing (SCS) is 60 kHz, one subframe (or frame) may include four slots with reference to Table 3 and one subframe={1, 2, 4} slots shown in FIG. 3, for example, the number of slot(s) that may be included in one subframe may be defined as in Table 2.

Further, a mini-slot may consist of 2, 4, or 7 symbols, or may consist of more symbols or less symbols.

In relation to physical resources in the NR system, an antenna port, a resource grid, a resource element, a resource block, a carrier part, etc., may be considered.

Hereinafter, the above physical resources that may be considered in the NR system are described in more detail.

First, in relation to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. In this case, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^{\mu} N_{sc}^{RB}$ subcarriers, and $2^{\mu} N_{symb}^{(\mu)}$ OFDM symbols, where $N_{RB}^{\mu} \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l̄), where k=0, ..., $N_{RB}^{\mu} N_{sc}^{RB}-1$ is an index on a frequency domain, and l̄=0, ..., $2^{\mu} N_{symb}^{(\mu)}-1$ refers to a location of a symbol in a subframe. The index pair (k,l) is used to refer to a resource element in a slot, where l=0, ..., $N_{symb}^{\mu}-1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWPi}^{size}-1$, where i is No. of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, may be the common resource block where the BWP starts relative to the common resource block 0.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Synchronization Signal Block (SSB)

FIG. 7 illustrates an example SSB structure. The UE may perform cell search, system information acquisition, beam alignment for initial access, and DL measurement based on the SSB. SSB is used interchangeably with a Synchronization Signal/Physical Broadcast Channel (SS/PBCH) block.

Referring to FIG. 7, the SSB is composed of a PSS, a SSS and a PBCH. The SSB is configured in 4 contiguous OFDM symbols, and the PSS, PBCH, SSS/PBCH and PBCH are individually transmitted in the OFDM symbols. The PSS and SSS each are composed of 1 OFDM symbol and 127 subcarriers, and the PBCH is composed of 3 OFDM symbols and 576 subcarriers.

Polar coding and Quadrature Phase Shift Keying (QPSK) are applied to the PBCH. The PBCH is composed of a data RE and a demodulation reference signal (DMRS) RE for each OFDM symbol. There are 3 DMRS REs for each RB, and 3 data REs exist between the DMRS REs.

FIG. 8 is a view illustrating an example in which a UE obtains information on DL time synchronization.

The UE may obtain DL synchronization by detecting the SSB. The UE may identify the structure of the SSB burst set based on the detected SSB index, and accordingly, may detect a symbol/slot/half-frame boundary. The number of the frame/half-frame to which the detected SSB belongs may be identified using SFN information and half-frame indication information.

Specifically, the UE may obtain 10-bit SFN (System Frame Number) information from the PBCH (s0 to s9). Of the 10-bit SFN information, 6 bits are obtained from the MIB (Master Information Block), and the remaining 4 bits are obtained from the PBCH TB (Transport Block).

Next, the UE may obtain 1-bit half-frame indication information (c0). When the carrier frequency is 3 GHz or less, the half-frame indication information may be implicitly signaled using a PBCH DMRS. The PBCH DMRS indicates 3-bit information using one of 8 PBCH DMRS sequences. Therefore, when L=4, the remaining one bit other than those indicating the SSB index among the 3 bits that may be indicated using the 8 PBCH DMRS sequences may be used for half-frame indication.

Finally, the UE may obtain an SSB index based on the DMRS sequence and PBCH payload. SSB candidates are indexed from 0 to L−1 in order of time within the SSB burst set (i.e., half-frame). When L=8 or 64, the 3 LSBs (Least Significant Bits) of the SSB index may be indicated using 8 different PBCH DMRS sequences (b0 to b2). When L=64, the 3 MSBs (Most Significant Bits) of the SSB index are indicated through the PBCH (b3 to b5). When L=2, the 2 LSBs of the SSB index may be indicated using four different PBCH DMRS sequences (b0, b1). When L=4, the remaining one bit other than those indicating the SSB index among the 3 bits that may be indicated using the 8 PBCH DMRS sequences may be used for half-frame indication (b2).

System Information Acquisition

FIG. 9 is a view illustrating an example process for obtaining system information (SI) by a UE. The UE may obtain AS-/NAS-information through a system information (SI) acquisition process. The SI acquisition process may be applied to the UE in an RRC_IDLE state, an RRC_INACTIVE state, and an RRC_CONNECTED state.

The SI is divided into an MIB (Master Information Block) and a plurality of SIBs (System Information Blocks). The SI other than the MIB may be referred to as RMSI (Remaining Minimum System Information). For details, refer to the following.

The MIB includes information/parameters related to SIB1 (System Information Block1) reception and is transmitted through the PBCH of the SSB. In initial cell selection, the UE assumes that the half-frame with SSB is repeated in 20 ms cycles. The UE may identify whether there is a CORESET (Control Resource Set) for the Type0-PDCCH common search space based on the MIB. The Type0-PDCCH common search space is a kind of PDCCH search space and is used to transmit a PDCCH for scheduling SI messages. If there is a Type0-PDCCH common search space, the UE may determine (i) one or more contiguous symbols and a plurality of contiguous RBs constituting CORESET and (ii) PDCCH opportunity (i.e., a time domain location for PDCCH reception) based on the information in the MIB (e.g., pdcch-ConfigSIB1). When the Type0-PDCCH common search space does not exist, pdcch-ConfigSIB1 provides information regarding a frequency location in which SSB/SIB1 exists and a frequency range in which SSB/SIB1 does not exist.

SIB1 includes information related to availability and scheduling (e.g., transmission period, SI-window size) of the remaining SIBs (hereinafter, SIBx, x is an integer greater than or equal to 2). For example, SIB1 may indicate whether SIBx is periodically broadcast or is provided at a request of the UE through an on-demand method. When SIBx is provided by an on-demand method, SIB1 may include information necessary for the UE to perform an SI request. SIB1 is transmitted through the PDSCH, the PDCCH scheduling SIB1 is transmitted through the Type0-PDCCH common search space, and SIB1 is transmitted through the PDSCH indicated by the PDCCH.

SIBx is included in the SI message and is transmitted through the PDSCH. Each SI message is transmitted within a time window (i.e., Si-window) which periodically occurs.

UL Transmission/Reception Operation

FIG. 10 is a view illustrating an example of uplink transmission/reception.

Referring to FIG. 10, the base station schedules uplink transmission, such as a frequency/time resource, a transport layer, an uplink precoder, and MCS (S1001). In particular, the base station may determine a beam for PUSCH transmission by the UE through the beam management operations described above. The UE receives the DCI for uplink scheduling (i.e., including scheduling information for the PUSCH) from the base station on the PDCCH (S1002). DCI format 0_0 or 0_1 may be used for uplink scheduling, and in particular, DCI format 0_1 includes the following information: Identifier for DCI formats, UL/SUL (Supplementary uplink) indicator, bandwidth part indicator, frequency domain resource assignment, time domain resource assignment, frequency hopping flag, modulation and coding scheme (MCS), SRS resource indicator (SRI), precoding information and number of layers, antenna port(s), SRS request, DMRS sequence initialization, UL-SCH (Uplink Shared Channel) indicator In particular, SRS resources configured in the SRS resource set associated with the higher layer parameter 'usage' may be indicated by the SRS resource indicator field. Further, 'spatialRelationInfo' may be configured for each SRS resource, and its value may be one of {CRI, SSB, SRI}.

The UE transmits uplink data to the base station on the PUSCH (S1003). When the UE detects the PDCCH including the DCI format 0_0 or 0_1, the UE transmits the corresponding PUSCH according to an indication by the corresponding DCI. For PUSCH transmission, two transmission schemes are supported: codebook-based transmission; and non-codebook-based transmission.

In the case of codebook-based transmission, when the higher layer parameter 'txConfig' is set to 'codebook', the UE is configured to do codebook-based transmission. On the other hand, when the higher layer parameter 'txConfig' is set to 'nonCodebook', the UE is configured to do non-codebook based transmission. If the higher layer parameter 'txConfig' is not configured, the UE does not expect to be scheduled according to DCI format 0_1. When the PUSCH is scheduled according to DCI format 0_0, PUSCH transmission is based on a single antenna port. In the case of codebook-based transmission, the PUSCH may be scheduled in DCI format 0_0, DCI format 0_1, or semi-statically. When this PUSCH is scheduled by DCI format 0_1, the UE determines the PUSCH transmission precoder based on the SRI, Transmit Precoding Matrix Indicator (TPMI) and transmission rank from the DCI, as given by the SRS resource indicator field and the Precoding information and number of layers field. The TPMI is used to indicate a precoder to be applied across the antenna port, and corresponds to the SRS resource selected by the SRI when multiple SRS resources are configured. Alternatively, when a single SRS resource is configured, the TPMI is used to indicate a precoder to be applied across the antenna port, and corresponds to the single SRS resource. A transmission precoder is selected from an uplink codebook having the same number of antenna ports as the higher layer parameter 'nrofSRS-Ports'. When the higher layer in which the UE is set as 'codebook' is configured as the parameter 'txConfig', at least one SRS resource is configured in the UE. The SRI indicated in slot n is associated with the most recent transmission of the SRS resource identified by the SRI, where the SRS resource precedes the PDCCH carrying the SRI (i.e., slot n).

In the case of non-codebook-based transmission, the PUSCH may be scheduled in DCI format 0_0, DCI format 0_1, or semi-statically. When multiple SRS resources are configured, the UE may determine the PUSCH precoder and transmission rank based on the wideband SRI, where the SRI is given by the SRS resource indicator in the DCI or by the higher layer parameter 'srs-ResourceIndicator'. The UE uses one or multiple SRS resources for SRS transmission, where the number of SRS resources may be set for simultaneous transmission within the same RB based on UE capability. Only one SRS port is configured for each SRS resource. Only one SRS resource may be configured by the higher layer parameter 'usage' set to 'nonCodebook'. The maximum number of SRS resources that may be configured for non-codebook-based uplink transmission is 4. The SRI indicated in slot n is associated with the most recent transmission of the SRS resource identified by the SRI, where the SRS transmission precedes the PDCCH carrying the SRI (i.e., slot n).

Uplink Grant

In the case of NR, the uplink grant may be divided into (1) a dynamic grant (or with grant) and (2) a configured grant (or grant free or without grant).

FIG. 11 is a view illustrating an example uplink grant. FIG. 11 (a) illustrates an example of the dynamic grant, and FIG. 11 (b) illustrates an example of the configured grant.

The dynamic grant refers to a scheduling-based data transmission/reception method by a base station to maximize resource utilization. This means that when there is data to be transmitted, the UE may first send a request for uplink resource allocation to the base station and transmit data using only the uplink resource allocated by the base station. To efficiently use uplink radio resources, the base station needs to know what kind of data and how much of it is to be transmitted for each UE. Accordingly, the UE may transfer information regarding the uplink data that the UE is to directly transmit to the base station and, based thereupon, the base station may allocate uplink resources to the corresponding UE. In this case, the information regarding the uplink data transmitted from the UE to the base station is the amount of uplink data stored in its own buffer, and this is referred to as a buffer status report (BSR). The BSR is transmitted using a MAC control element when the UE is allocated resources on the PUSCH in the current TTI and a reporting event is triggered.

FIG. 11(a) illustrates an example uplink resource allocation process for actual data when no uplink radio resource for buffer status reporting (BSR) is allocated to the UE. That is, since a UE switching the state from the DRX mode to the active mode lacks a pre-allocated data resource, the UE needs to send a request for a resource for uplink data starting from SR transmission through the PUCCH and, in this case, a five-step uplink resource allocation procedure is used.

Referring to FIG. 11(a), when a PUSCH resource for transmitting a BSR is not allocated, the UE first transmits a scheduling request (SR) to the base station to receive PUSCH resource allocation. The scheduling request is used to send a request for the UE to receive a PUSCH resource allocation for uplink transmission when the UE is not scheduled for radio resources on the PUSCH in the current TTI even though a reporting event has occurred. That is, the UE transmits the SR on the PUCCH when a regular buffer status report (regular BSR) is triggered but does not have uplink radio resources for transmitting the BSR to the base station. The UE transmits the SR through the PUCCH or initiates a random access procedure according to whether the PUCCH resource for the SR is configured. Specifically, the PUCCH resource through which the SR may be transmitted is UE-specifically configured by a higher layer (e.g., RRC layer), and the SR configuration includes SR periodicity and SR subframe offset information. When the UE receives the UL grant for the PUSCH resource for BSR transmission from the base station, the UE transmits the triggered BSR through the PUSCH resource allocated by the UL grant to the base station. The base station identifies the amount of data to be actually transmitted by the UE on the uplink through the BSR and transmits the UL grant for the PUSCH resource for actual data transmission to the UE. The UE receiving the UL grant for actual data transmission transmits actual uplink data to the base station through the allocated PUSCH resource.

A configured grant method is described with reference to FIG. 11(b).

The UE receives a resource configuration for UL data transmission without grant from the base station. The resource configuration may be performed only by RRC signaling (type 1), or may be performed by layer-1 (L1) signaling and RRC signaling (type 2). The UE performs initial transmission to the base station based on the resource configuration received without grant. In this case, the initial transmission may be repeated, and the initial transmission for the same transport block may be repeated K times (K≥1).

Resources for initial transmission by a configured grant may or may not be shared among one or more UEs.

When the initial transmission by the configured grant fails, the base station may transmit a grant for retransmission for TB related to the initial transmission to the UE. In this case, the base station needs to identify the UE even when a collision occurs. A UE performing UL transmission without UL grant may be identified based on time/frequency resources and reference signal (RS) parameters.

The base station may allocate different DMRS resources to different UEs sharing the same PUSCH resource. When the UE performs retransmission, the UE switches on a grant basis, receives a grant from the base station, and performs retransmission based on the grant. That is, the UE performs initial transmission without grant, but performs retransmission on a grant basis.

Sequence Initialization Considering the UEs Equipped with Multiple Panels (Method 1)

The disclosure proposes signaling between a base station and a UE and operations of the base station and the UE for effective wireless communication between the base station and UE equipped with one or more multiple transmission/reception antenna panels. To effectively transmit/receive a specific reference signal (RS) and/or physical channels, the base station may explicitly or implicitly indicate/configure/activate/deactivate the UE's specific TX (transmission)/RX (reception) panel.

As used herein, "panel" may be interchangeably interpreted/applied as a "plurality of (or at least one) panels" or a "panel group" (having similarity/common value in a specific characteristic aspect (e.g., timing advance (TA), power control parameter, etc.).

Or, as used herein, "panel" may be interchangeably interpreted/applied as a "plurality of (or at least one) antenna ports" or a "plurality of (or at least one) uplink resources" or an "antenna port group" or an "uplink resource group (or set)" (having similarity/common value in a specific characteristic aspect (e.g., TA, power control parameter, etc.).

Or, as used herein, "panel" may be interchangeably interpreted/applied as a "plurality of (or at least one) beams" or "at least one beam group (or set)" (having similarity/common value in a specific characteristic aspect (e.g., TA, power control parameter, etc.). Or, as used herein, "panel" may be defined as a unit for the UE to configure a transmission/reception beam. For example, "transmission panel" may be defined as a unit that may generate a plurality of candidate transmission beams in one panel but, for transmission at a specific time, may use only one beam among them (that is, for transmission of a specific uplink signal/channel, only one transmission beam (spatial relation information RS) per Tx panel may be used).

Further, as used herein, "panel" may denote a "plurality of (or at least one) antenna ports" or an "antenna port group" or an "uplink resource group (or set)" having common/similar uplink synchronization and may be interchangeably interpreted/applied, more commonly, as "uplink synchronization unit (USU)". As used herein, "panel" may be interchangeably interpreted/applied, more commonly, as "uplink transmission entity (UTE)."

Further, the "uplink resource (or resource group)" may be interchangeably interpreted/applied as PUSCH/PUCCH/SRS/PRACH resource (or resource group (or set)). Further, the change, interpretation/application may be reversely applied. Further, as used herein, "antenna (or antenna port)" may denote a physical or logical antenna (or antenna port).

In other words, as used herein, "panel" may be interpreted in various manners, as a "UE antenna element group," "UE antenna port group," "or "UE logical antenna group" and, for what physical/logical antennas or antenna ports are bundled up and mapped into one panel, various schemes may be considered given, e.g., the inter-antenna position/distance/correlation, RF configuration, and/or antenna (port) virtualization scheme, and such mapping process may be varied depending on the implementation of the UE. Further, as used herein, "panel" may be changed to and interpreted/applied as a "plurality of panels" or a "panel group" (having similarity in a specific characteristic aspect).

Hereinafter, multiple transmission/reception antenna panel may have the same meaning as, or may be interchangeably used with, a multiple TX/RX panel or a multi-panel. Further, A and/or B means at least one of A or B. Antenna panel may mean that several antenna elements are mounted on one physical panel. Further, in the case of a base station/UE equipped with a multi-antenna panel, direction to which the antenna panels are directed may be different, and accordingly, the direction of the transmission/reception beam of each panel may be different. Hereinafter, 'panel' of the base station/UE may be used in the same meaning as the 'antenna panel' and the 'transmission/reception panel' of the base station/UE.

Resource Allocation Scheme for Reference Signal Transmission

First, the UE may receive an indication of a configuration related to a reference signal from the base station independently for each transmission/reception (TX/RX) panel. That is, when the base station configures the reference signal to the UE, the base station may configure/indicate the reference signal for each specific transmission/reception panel of the UE. The reference signals may include a sounding reference signal (SRS), a channel state information-reference signal (CSI-RS), a dedicated demodulation-reference signal (DM-RS), a positioning reference signal (PRS), synchronization signals (SS), and a phase tracking-reference signal (PT-RS). In this case, a certain mapping relationship between the antenna panel transmitting a specific reference signal and a resource through which the specific reference signal is transmitted may be pre-configured. When a specific reference signal is transmitted on a specific resource based on the mapping relationship, the antenna panel where the specific reference signal is transmitted may be identified based on the mapping relationship.

Further, the base station may configure/indicate a specific panel used by the UE for transmission/reception of a physical channel(s) by individually indicating/configuring physical channel(s) in interworking/connection with the UE's specific transmission/reception panel. The physical channels may include a physical uplink control channel (PUCCH), a physical uplink shared channel (PUSCH), a physical downlink control channel (PDCCH), and a physical downlink shared channel (PDSCH).

The operation of the base station to indicate/configure the physical channel(s) in the UE for each transmission/reception panel may be necessary when configuring/indicating an independent reference signal (DM-RS, CSI-RS, etc.) for each reception panel of the UE. For example, the operation may be used to configure/indicate different DM-RSs in two panels of the UE or to configure/indicate different CSI-RS/SRS resources and/or CSI-RS/SRS resource sets in the two panels.

Second, resources allocated to the UE for reference signal transmission may be shared among a plurality of transmission/reception panels mounted on the UE. More specifically, a specific CSI-RS/SRS resource and/or all or some of the CSI-RS/SRS resources allocated to the UE may be shared among different transmission/reception panels of a specific UE. In this case, if there is no separate indication/configuration by the base station, the UE is configured by default to automatically recognize that the configured CSI-RS/SRS resource and/or CSI-RS/SRS resource set is shared for all the panels of the UE. Conversely, the base station may configure/indicate the operation of the UE so that the UE performs the above-described operation.

In both the case in which a reference signal is independently configured for each panel of the UE and the case in which reference signal resources are shared by a plurality of panels, it is necessary to use different reference signal sequences. To use different reference signal sequences, a scheme for generating and configuring as many different scrambling identifiers (IDs) as the number of panels (scheme 1) and a scheme for using information related to the panel of the UE (scheme 2) may be used. In this case, when scheme 2 is used, RRC overhead for generating different reference signal sequences may be reduced. The scrambling ID may be expressed as a scrambling sequence ID.

More specifically, since the scrambling ID of the CSI-RS/SRS is composed of 10 bits, the RRC signaling overhead is 10×4 bits when the UE has 4 panels. On the other hand, when a sequence is generated and/or initialized considering information related to the panel of the UE, particularly the panel index (or ID), the four panels may be distinguished by a combination of bits, such as (00, 01, 10, 11). Therefore, only 2 additional bits are further charged for extra RRC signaling overhead. For example, a different reference signal sequence may be configured/allocated/used for each panel of the UE by configuring one scrambling ID information and information related to the UE's panel in one CSI-RS/SRS resource.

Here, the information related to the panel of the UE may be expressed as 'transmission/reception panel information/ identifier', 'transmission/reception panel identifier', 'panel identifier', and "panel identification information". The panel identifier may include at least one of a (transmission/ reception) panel index (or ID), a reference signal (RS) set ID, and an RS (or antenna) port/resource (group/set) ID.

When the RS set ID is used as the transmission/reception panel identifier, a specific transmission/reception panel of the UE may be previously configured to transmit a reference signal in a specific RS set. Specifically, if the UE is equipped with N transmission (/reception) antenna panels (e.g., N=2) and may use them for UL transmission, the base station may configure a separate/independent specific RS resource (set), e.g., SRS resource, in the UE to separately initiate UL transmission from each panel of the UE (scheme 1). In this case, the UE may report capability information related to the antenna panel equipped in the UE to the base station.

According to scheme 1, the reference signal resource (set) having the same number as the number of the antenna panel of the UE may be allocated to the UE. More specifically, in the case of scheme 1, a specific reference signal resource (set) corresponding to antenna panel #1 of the UE may be configured, and a specific resource (set) corresponding to antenna panel #2 of the UE may be configured. For example, SRS resource/set ID #1 may be configured in antenna panel #1, and SRS resource/set ID #2 may be configured in antenna panel #2. That is, resources for transmitting as many reference signals as the number of antenna panels equipped in the UE need to be allocated.

Assuming that a specific identifier of the transmission/ reception antenna panel of the UE considered in the disclosure is given, the base station may commonly configure a specific reference signal resource (set) over a plurality of the antenna panels of UEs and associate a panel identifier, particularly, panel ID, with them, thereby indicating the operation of each panel (scheme 2). In this case, the UE may report capability information related to the antenna panel equipped in the UE to the base station.

According to scheme 2, the reference signal resource (set) having the same number as the number of the antenna panel of the UE need not be allocated to the UE. More specifically, a specific reference signal resource (set) and panel ID pair corresponding to antenna panel #1 of the UE may be configured, and a specific reference signal resource (set) and panel ID pair corresponding to antenna panel #2 of the UE may be configured. For example, {SRS resource (set) ID #1, panel ID #1} and {SRS resource (set) ID #1, panel ID #2} may be configured. That is, a specific panel among the antenna panels equipped in the UE may be selectively used in the same reference signal resource for reference signal transmission. The base station may identify the antenna panel used to transmit the reference signal based on the panel ID.

As described above, if a panel identifier configuration (particularly, panel ID) is provided to the UE, the specific panel ID may be used as a factor for sequence generation when generating a sequence related to a specific UL signal transmitted using a specific panel. Therefore, the same resource (resource ID) is shared among different transmission panels of the UE but, as the panel ID is used as a factor for sequence generation, different sequences may be allocated/used. In this case, the same scrambling ID may be configured to allocate/use different sequences.

Scheme 2 presents an effect that quasi-orthogonality characteristics may be applied between the generated sequences. Further, if the transmission beams (TX beams) individually generated from the panels are significantly separated from one another as the different transmission panels of the UE have different directions, the above-described scheme may efficiently use time/frequency resources by distinguishing only sequences with less overhead.

Initialization of the SRS Sequence Considering the Multiple Transmission/Reception Panels of the UE For example, upon generating and/or initializing an SRS sequence, the base station may define/configure/indicate for the UE that "$N^{Panel}$" which is the panel identification value for a specific panel is used as a specific parameter of the SRS sequence generation and/or initialization function. The panel identifier may include a transmission (/reception) panel ID and an SRS resource/resource set ID.

First, the SRS sequence for the SRS resource may be generated by the following equation that does not reflect the factor "$N^{Panel}$".

$$r^{(p_i)}(n,l')=r_{u,v}^{(\alpha,\delta)}(n)$$

$$0 \le n \le M_{sc,b}^{RS}-1$$

$$l' \in \{0,1, \ldots, N_{symb}^{SRS}-1\} \quad \text{[Equation 3]}$$

In the above equation, $M_{sc,b}^{RS}$ is the length of the SRS sequence, and $r_{u,v}^{(\alpha,\delta)}(n)$ is the Low-PAPR sequence and may be given together with $\delta=\log_2(K_{TC})$. Further, the transmission comb number $K_{TC}$ may be included in the higher layer parameter "transmissionComb". For the antenna port $p_i$, the cyclic shift value $\alpha_i$ is given by the following equation.

$$\alpha_i = 2\pi \frac{n_{SRS}^{cs,i}}{n_{SRS}^{cs,max}} \quad \text{[Equation 4]}$$

$$n_{SRS}^{cs,i} = \left(n_{SRS}^{cs} + \frac{n_{SRS}^{cs,max}(p_i-1000)}{N_{ap}^{SRS}}\right) \mod n_{SRS}^{cs,max}$$

In the above equation, $n_{SRS}^{cs} \in \{0, 1, \ldots, n_{SRS}^{cs,max}-1\}$ may be included in the higher layer parameter "transmissionComb". The maximum value $n_{SRS}^{cs,max}$ of the cyclic shift meets the following: if $K_{TC}=4$, $n_{SRS}^{cs,max}=12$, and if $K_{TC}=2$, $n_{SRS}^{cs,max}=8$.

The sequence group is $u=(f_{gh}(n_{s,f}^\mu,l')+n_{ID}^{SRS})\mod 30$, and the sequence number v depends on the higher layer parameter "groupOrSequenceHopping" included in the SRS-Config IE (Information Element). The SRS sequence identifier $n_{ID}^{SRS}$ Is included in the higher layer parameter "sequenceId" included in the SRS-Config IE, and l', which is the number of the OFDM symbol in the SRS resource meets $l' \in \{0, 1, \ldots, N_{symb}^{SRS}-1\}$.

Described below is a method for generating/initializing an SRS sequence. For convenience of description, it is described that the panel ID is used as a factor of sequence generation, but the present method may be applied likewise to the SRS resource/resource set ID included in the panel identifier.

To generate/use a sequence that varies according to the panel ID of the UE, the transmission panel ID of the UE may be additionally used as a factor for determining the sequence group when determining/configuring/indicating the sequence group. In other words, in $u=(f_{gh}(n_{s,f}^{\mu},l')+n_{ID}^{SRS})$ mod 30, in addition to the existing factors $n_{s,f}^{\mu}$, l', $n_{ID}^{SRS}$, the UE's panel ID $N^{Panel}$ may be considered. For example, the sequence group may be determined/configured/indicated based on a function that uses $n_{s,f}^{\mu}$, l', $n_{ID}^{SRS}$ and $N^{Panel}$ as factors.

When the higher layer parameter "groupOrSequenceHopping" indicates 'neither', group hopping or sequence hopping is not used, and the following equation is met.

$$f_{gh}(n_{s,f}^{\mu}, l') = 0$$ [Equation 5]
$$v = 0$$

When the higher layer parameter "groupOrSequenceHopping" indicates "groupHopping", only group hopping is used, and the following equation is met.

$$f_{gh}(n_{s,f}^{\mu}, l') =$$ [Equation 6]
$$\left(\sum_{m=0}^{7} c(8(n_{s,f}^{\mu}N_{symb}^{slot} + l_0 + l') + m) \cdot 2^m\right) \bmod 30$$
$$v = 0$$

Here, pseudo-random sequence c(i) is initialized as an initialization sequence value $c_{init}=n_{ID}^{SRS}$ at the beginning of each radio frame. In this case, to determine/configure/define the sequence initialization value $c_{init}$, in addition to $n_{ID}^{SRS}$, the UE's panel ID ($N^{Panel}$) may be used.

That is, the sequence initialization may be determined/defined/configured/indicated by a function of $n_{ID}^{SRS}$ and $N^{Panel}$. In this case, sequence initialization may be expressed as $c_{init}=f(n_{ID}^{SRS}, N^{Panel})$. For example, to avoid the same from being set depending on the two values $n_{ID}^{SRS}$ and $N_{Panel}$, $c_{init}=2^N X\, n_{ID}^{SRS}+N^{Panel}$. In this case, N is the amount of information (bits) used to configure the panel index of the UE.

When the higher layer parameter "groupOrSequenceHopping" indicates "sequenceHopping", sequence hopping is used, but group hopping is not used, and the following equation is met.

$$f_{gh}(n_{s,f}^{\mu}, l') = 0$$ [Equation 7]
$$v = \begin{cases} c(n_{s,f}^{\mu}N_{symb}^{slot} + l_0 + l') & M_{sc,b}^{SRS} \geq 6N_{sc}^{RB} \\ 0 & \text{otherwise} \end{cases}$$

Here, pseudo-random sequence c(i) is initialized as $c_{init}=n_{ID}^{SRS}$ at the start point of each radio frame. In this case, to determine/configure/define the sequence initialization value $c_{init}$, in addition to $n_{ID}^{SRS}$, the UE's TX panel ID ($N^{Panel}$) may be used. That is, the sequence initialization may be determined/defined/configured/indicated by a function of $n_{ID}^{SRS}$ and $N^{Panel}$. In other words, sequence initialization may be expressed as $c_{init}=f(n_{ID}^{SRS}, N^{Panel})$. For example, to avoid the same from being set depending on the two values $n_{ID}^{SRS}$ and $N^{Panel}$, $c_{init}=2^N X\, n_{ID}^{SRS}+N^{Panel}$. In this case, N is the amount of information (bits) used to configure the panel index of the UE.

The method in which the panel ID of the UE is used during SRS sequence generation has been described above. However, the method may be defined/configured/indicated to perform signal transmission using the panel ID as a factor even on other specific uplink (UL) transmission than the SRS.

For example, the method may be applied to the initialization, generation, and configuration of at least one of a PUSCH DM-RS sequence, a PUCCH DM-RS sequence, and a UL PT-RS sequence. Further, it may be defined/configured/indicated so that the panel identifier is applied as a scrambling ID/seed value (or a factor variable associated therewith) used for UL data scrambling upon PUSCH (and/or PUCCH) transmission. Further, it may also be possible to allow all of the UE multiple panels to be used in transmitting the same specific layer upon specific multi-layer UL transmission. The specific multi-layer UL transmission may include multi-layer PUSCH/DMRS transmission. In the multi-layer transmission, at least one of the above-described operations may be applied to generate a signal reflecting a different panel identifier (especially a panel ID value) for each panel of the UE. Further, the panel ID may define/configure/indicate a transmission operation to contribute to a specific common layer transmission. For example, there may be a single frequency network (SFN) transmission type. Conversely, an operation for defining/configuring/indicating transmission of each panel to be applied only to different/independent layer transmission may also be used separately.

In sum, it may be indicated/configured to use the UE's transmission/reception (TX/RX) panel information as well as such parameters as OFDM symbol, slot index, scrambling ID or physical cell ID so as to configure and/or sequence-initialize the reference signal sequence, such as SRS, CSI-RS, DM-RS, TRS, or PTRS. The transmission/reception panel information may include a panel index (or ID), a reference signal set ID, and a reference signal (or antenna) port/resource (group/set) ID.

Initialization of the CSI-RS Sequence Considering the Multiple Transmission/Reception Panels of the UE Initialization of the CSI-RS sequence without considering the multiple transmission/reception panels of the UE may be performed by the following equation.

$$c_{init}=(2^{10}(N_{symb}^{slot}n_{s,f}^{\mu}+l+1)(2n_{ID}+1)+n_{ID}) \bmod 2^{31}$$ [Equation 8]

$n_{s,f}^{\mu}$ is the number of slots in the radio frame, and l is the number of OFDM symbols in the slot. Further, $n_{ID}$ denotes the scrambling ID and may be included in the higher layer parameter "scramblingID".

According to the above equation, the initialization of the CSI-RS sequence considering the multiple transmission/reception panels of the UE, that is, based on the panel identifier of the UE may be performed by the following equation (proposal 1).

$$c_{init}=(2^{M+N}(N_{symb}^{slot}n_{s,f}^{\mu}+l+1)(2n_{ID}+1)+2^M \times N^{Panel}+n_{ID}) \bmod 2^L$$ [Equation 9]

$$c_{init}=(2^{M+N}(N_{symb}^{slot}n_{s,f}^{\mu}+l+1)(2n_{ID}+1)+2^N \times n_{ID}+N^{Panel}) \bmod 2^L$$ [Equation 10]

Equations 9 and 10, respectively, correspond to option 1 and option 2 of proposal 1. In this case, parameters included in Equations 9 and 10 of proposal 1 may be defined/configured as follows.

L: means the sequence length bits. For example, the 31 bits gold sequence or length-31 gold sequence is L=31, and in Equations 9 and 10, ( . . . )mod $2^{31}$.

$n_{ID} \in \{0, 1, \ldots, 2^M-1\}$: denotes the scrambling ID, and the scrambling ID is expressed in M bits.

$N_{symb}^{slot} \in \{12, 14, \ldots\}$: denotes the number of OFDM symbol(s) included in one slot. This is 14 in other cases than extended CP (cyclic prefix) and is 12 in the case of extended CP. Other than that, it may be a number larger than 1.

$N^{Panel} \in \{0, 1, \ldots, 2^N-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

For example, in the case of a 31-bit long sequence and a 10-bit long scrambling ID, Equation 9 (option 1) may be expressed as follows.

$$c_{init} = (2^{10+N}(N_{symb}^{slot} n_{s,f}^{\mu}+l+1)(2n_{ID}+1)+2^{10} \times n_{ID} + N^{Panel}+n_{ID}) \mod 2^{L31}$$ [Equation 11]

(Proposal #1-1) The CSI-RS sequence initialization method may be used/applied to the PRS (positioning RS) sequence initialization method in the same or a similar manner.

(Proposal #1-2) when L=31 in Equations 9 and 10, for the M+N value not to exceed 19 (that is, M+N≤19) $n_{ID}$ and/or $N^{Panel}$ may be configured/indicated.

More specifically, considering the numerology according to subcarrier spacing of the NR system, if M+N exceeds 19, the same $c_{init}$ value may be generated in one frame according to such parameters as OFDM symbol index and slot index. Therefore, allowing M+N not to exceed 19 may prevent the same $c_{init}$ value from being generated in one frame. In other words, it is intended to use/configure/indicate independent sequence initialization values $c_{init}$ different from one another in all the symbols and slots in one frame.

In the above two options (option 1 and option 2), the principle of configuring/defining the sequence initialization equation is similar for the two options. However, when the other factors (symbol index, slot index, and scrambling ID) than the panel identifier ($N^{Panel}$) in the above equation are set to fixed values, the capability of the sequence generated according to each option may differ considering the initialization sequence value generated according to each option. That is, in the case of option 2, $c_{init}$ which increases as the panel identifier increases by 1 becomes smaller than in the case of option 1. In the case of option 1, the panel identifier and $2^M$ are multiplied. Therefore, if M has a value greater than 1, although $c_{init}$ is generated based on the same panel identifier in option 1 and option 2, the $c_{init}$ value determined based on the panel identifier resultantly becomes larger in option 1 than in option 2. In this case, since the CSI-RS scrambling ID bits of NR are 10 bits, it may be assumed that M=10.

If the sequences are individually generated using two sequence initialization values ($c_{init}$), the cross-correlation performance between the two generated sequences is affected by the difference between the initialization values. In general, the greater the difference between the initialization values, the better the cross-correlation performance may be between the two generated sequences. Therefore, to use a sequence with better cross-correlation performance for two sequences generated according to the antenna panel ID value, it may be preferable to generate the sequence by the method for option 1 rather than option 2.

Initialization of DM-RS for PDSCH and/or DM-RS Sequence for PUSCH Considering UE's Multiple Transmission/Reception Panels Initialization of the DM-RS sequence for PDSCH without considering the multiple transmission/reception panels of the UE may be performed by the following equation.

$$c_{init} = (2^{17}(N_{symb}^{slot} n_{s,f}^{\mu}+l+1)(2N_{ID}^{nSCID}+1)+2N_{ID}^{nSCID} \times n_{SCID}) \mod 2^{31}$$ [Equation 12]

$n_{s,f}^{\mu}$ is the number of slots in the radio frame, and l is the number of OFDM symbols in the slot. $N_{ID}^0, N_{ID}^1$ meets $N_{ID}^0, N_{ID}^1 \in \{0, 1, \ldots 65535\}$ and, if provided, may be given by each of the higher layer parameters "scramblingID0" and "scramblingID1" included in the DMRS-DownlinkConfig IE. Further, the PDSCH is scheduled by the PDCCH using DCI format 1_1 having the CRC scrambled with C-RNTI or CS-RNTI. If provided, $N_{ID}^0$ given by the higher layer parameter "scramblingID0" included in the DMRS-DownlinkConfig IE meets $N_{ID}^0 \in \{0, 1, \ldots, 65535\}$. Also, PDSCH is scheduled by PDCCH using DCI format 1_0 with the CRC scrambled with C-RNTI or CS-RNTI. Otherwise, $N_{ID}^{nSCID} = N_{ID}^{cell}$ is met.

When DCI format 1_1 is used, $n_{SCID}$ meets $n_{SCID} \in \{0,1\}$ by the DM-RS sequence initialization field included in the DCI related to PDSCH transmission but, otherwise, has a value of 0.

According to the above equation, the initialization of the DM-RS for PDSCH and/or DM-RS sequence for PUSCH considering the multiple transmission/reception panels of the UE, that is, based on the panel identifier of the UE may be performed by the following equation (proposal 2).

$$c_{init} = (2^{N+R+1}(N_{symb}^{slot} n_{s,f}^{\mu}+l+1)(2N_{ID}^{nSCID}+1)+2^{R+1} \times N^{Panel}+2N_{ID}^{nSCID}+n_{SCID}) \mod 2^L$$ [Equation 13]

$$c_{init} = (2^{N+R+1}(N_{symb}^{slot} n_{s,f}^{\mu}+l+1)(2N_{ID}^{nSCID}+1)+2^{N+1} \times N_{ID}^{nSCID}+2N^{Panel}+n_{SCID}) \mod 2^L$$ [Equation 14]

Equations 13 and 14, respectively, correspond to option 1 and option 2 of proposal 2. In this case, parameters included in Equations 13 and 14 may be defined/configured as follows.

L: means the sequence length bits. For example, the 31 bits gold sequence or length-31 gold sequence is L=31, and in Equations 13 and 14, $( \ldots ) \mod 2^{31}$ $N_{ID}^{nSCID} \in \{0, 1, \ldots, 2^R-1\}$: denotes the scrambling ID, and the scrambling ID is expressed in R bits. It also meets the following: $n_{SCID} \in \{0,1\}$ $N^{Panel} \in \{0, 1, \ldots, 2^N-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

Additionally, the initialization method for the DM-RS for the PDSCH and/or the DM-RS sequence for PUSCH may be used/applied to the PTRS sequence initialization method in the same or a similar manner.

(Proposal #2-1) when L=31 in Equations 13 and 14, for the N+R+1 value not to exceed 19 (that is, N+R≤18) $n_{ID}$ and/or $N^{Panel}$ may be configured/indicated.

More specifically, considering the numerology according to subcarrier spacing of the NR system, if M+N exceeds 19, the same $c_{init}$ value may be generated in one frame according to such parameters as OFDM symbol index and slot index. Therefore, allowing M+N not to exceed 19 may prevent the same $c_{init}$ value from being generated in one frame. In other words, it is intended to use/configure/indicate independent sequence initialization values $c_{init}$ different from one another in all the symbols and slots in one frame.

Initialization of DM-RS for PDCCH and/or DM-RS Sequence for PUCCH Considering UE's Multiple Transmission/Reception Panels Initialization of the DM-RS sequence for PDCCH without considering the multiple transmission/reception panels of the UE may be performed by the following equation.

$$c_{init}=(2^{17}(14n_{s,f}^{\mu}+l+1)(2n_{ID}+1)+2N_{ID}) \mod 2^{31} \quad [\text{Equation 15}]$$

$n_{s,f}^{\mu}$ is the number of slots in the radio frame, and l is the number of OFDM symbols in the slot. If provided, $n_{ID}$ given by the higher layer parameter "pdcch-DMRS-ScramblingID" meets $N_{ID} \in \{0, 1, \ldots, 65535\}$, Otherwise, $N_{ID}=N_{ID}^{cell}$ is met.

According to the above equation, the initialization of the DM-RS sequence for PDCCH and/or DM-RS sequence for PUCCH considering the multiple transmission/reception panels of the UE, that is, based on the panel identifier of the UE may be performed by the following equation (proposal 3).

$$c_{init}=(2^{R+N}(N_{symb}^{slot}n_{s,f}^{\mu}+l+1)(2N_{ID}+1)+2^R \times N^{Panel}+2N_{ID}) \mod 2^L \quad [\text{Equation 16}]$$

$$c_{init}=(2^{R+N}(N_{symb}^{slot}n_{s,f}^{\mu}+l+1)(2N_{ID}+1)+2^N \times 2N_{ID}+N^{Panel}) \mod 2^L \quad [\text{Equation 17}]$$

Equations 16 and 17, respectively, correspond to option 1 and option 2 of proposal 3. In this case, parameters included in Equations 16 and 17 may be defined/configured as follows.

L: means the sequence length bits. For example, the 31 bits gold sequence or length-31 gold sequence is L=31, and in Equations 13 and 14, ( . . . )mod $2^{31}$.

$N_{ID} \in \{0, 1, \ldots, 2^R-1\}$: denotes the scrambling ID, and the scrambling ID is expressed in R bits. It also meets the following:

$N^{Panel} \in \{0, 1, \ldots, 2^N-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

Additionally, the initialization method for the DM-RS for the PDCCH and/or the DM-RS sequence for PUCCH may be used/applied to the PTRS sequence initialization method in the same or a similar manner.

(Proposal #3-1) when L=31 in Equations 16 and 17, for the M+N value not to exceed 19 (that is, N+R≤19) $n_{ID}$ and/or $N_{Panel}$ may be configured/indicated.

More specifically, considering the numerology according to subcarrier spacing of the NR system, if M+N exceeds 19, the same $c_{init}$ value may be generated in one frame according to such parameters as OFDM symbol index and slot index. Therefore, allowing M+N not to exceed 19 may prevent the same $c_{init}$ value from being generated in one frame. In other words, it is intended to use/configure/indicate independent sequence initialization values $c_{init}$ different from one another in all the symbols and slots in one frame.

As described above, a difference in performance may occur in a sequence generated based on an initialization sequence generated according to each option.

PDCCH Scrambling Sequence Generation Considering Multiple Transmission/Reception Panels of UE Generation of a scrambling sequence on the PDCCH without considering the multiple transmission/reception panels of the UE may be performed as follows.

The UE assumes that the bit block b(0), . . . , b($M_{bit}$−1) (where $M_{bit}$ means the number of bits transmitted on the physical channel) is scrambled prior to modulation, and as a result, the scrambled bit block $\tilde{b}(0), \ldots, \tilde{b}(M_{bit}-1)$ is generated.

The bit block may be generated by the following equation.

$$\tilde{b}(i)=(b(i)+c(i)) \mod 2 \quad [\text{Equation 18}]$$

c(i) denotes the scrambling sequence, and the scrambling sequence may be initialized by the following equation.

$$c_{init}=(n_{RNTI}2^{16}+n_{ID}) \mod 2^{31} \quad [\text{Equation 19}]$$

In a UE-specific search space, $n_{ID}$ may meet $n_{ID} \in \{0, 1, \ldots, 65535\}$, and this may be indicated by the higher layer parameter "pdcch-DMRS-ScramblingID". Otherwise, $n_{ID}=N_{ID}^{cell}$ is met.

Further, when $n_{RNTI}$ higher layer parameter "pdcch-DMRS-ScramblingID" is configured, it may be given by the C-RNTI for the PDCCH in the UE-specific search space. Otherwise, $n_{RNTI}=0$ is met.

According to the above equation, the generation of a PDCCH scrambling sequence considering the multiple transmission/reception panels of the UE, that is, based on the panel identifier of the UE may be performed by the following equation (proposal 4).

$$c_{init}=(n_{RNTI} \times 2^{R+N}+2^R \times N^{Panel}+n_{ID}) \mod 2^L \quad [\text{Equation 20}]$$

$$c_{init}=(n_{RNTI} \times 2^{R+N}+2^N \times n_{ID}+N^{Panel}) \mod 2^L \quad [\text{Equation 21}]$$

Equations 20 and 21, respectively, correspond to option 1 and option 2 of proposal 4. In this case, parameters included in Equations 20 and 21 may be defined/configured as follows.

L: means the sequence length bits. For example, the 31 bits gold sequence or length-31 gold sequence is L=31, and in Equations 20 and 21, ( . . . )mod $2^{31}$.

$N^{Panel} \in \{0, 1, \ldots, 2^N-1\}$: denotes the UE's transmission/reception (TX/RX) panel information. The transmission/reception panel information may be expressed/configured using N bits. The transmission/reception panel information may include the UE's transmission/reception panel ID. Further, the panel identifier may be the ID of a specific reference signal set or a specific reference signal (or antenna) port/resource (group/set) ID.

$N_{ID} \in \{0, 1, \ldots, 2^R-1\}$: denotes the scrambling ID, and the scrambling ID is expressed in R bits.

(Proposal #4-1) when L=31 in Equations 20 and 21, for the N+R value not to exceed 19 (that is, N+R≤19) $n_{ID}$ and/or $N_{Panel}$ may be configured/indicated.

More specifically, considering the numerology according to subcarrier spacing of the NR system, if N+R exceeds 19, the same $c_{init}$ value may be generated in one frame according to such parameters as OFDM symbol index and slot index. Therefore, allowing N+R not to exceed 19 may prevent the same $c_{init}$ value from being generated in one frame. In other words, it is intended to use/configure/indicate independent sequence initialization values $c_{init}$ different from one another in all the symbols and slots in one frame.

As described above, a difference in performance may occur in a sequence generated based on an initialization sequence generated according to each option.

Additionally, a difference in performance between the sequences generated according to the options (option 1 and option 2) in the above proposals may occur. In other words, a difference in cross-correlation performance between the sequences may occur depending on how the UE's panel identifier (which may also be referred to as a panel index) is reflected in the sequence initialization equation of CSI-RS/DM-RS.

First, in the equations (equation 8 or equation 12) in which the panel identifier of the UE is not considered, the CSI-RS/DM-RS sequence initialization equation may be divided into a part multiplied with $(2n_{ID}+1)$ and another part which is added to the $(2n_{ID}+1)$-multiplied part. That is, unlike the options of proposals 1 to 4 discussed above, if the panel identifier is reflected to the part multiplied with $(2n_{ID}+1)$, it is possible to make the difference in sequence initialization value according to the difference in panel identifiers larger.

For example, a CSI-RS sequence equation including the panel identifier may be defined/determined/configured as follows.

$$c_{init}=(2^{M+C}(N_{symb}^{slot}n_{s,f}^{\mu}+l+1)(2n_{ID}+1)(2N^{Panel}+1)+2^{M} \times N^{Panel}+n_{ID}) \bmod 2^{L} \quad \text{[Equation 22]}$$

$$c_{init}=(2^{M+C}(N_{symb}^{slot}n_{s,f}^{\mu}+l+1)(2n_{ID}+1) \times g(N^{Panel})+q(N^{Panel},n_{ID})) \bmod 2^{L} \quad \text{[Equation 23]}$$

$$c_{init}=(2^{M+C}(N_{symb}^{slot}n_{s,f}^{\mu}+l+1)(2n_{ID}+1) \times g(N^{Panel})+n_{ID}) \bmod 2^{L} \quad \text{[Equation 24]}$$

In this case, $g(N^{Panel})$ and $q(N^{Panel}, n_{ID})$, respectively, are the function for $N^{Panel}$ and the function for $N^{Panel}$, $n_{ID}$. For example, $q(N^{Panel}, n_{ID})$ may be most simply determined to be $2^{M} \times N^{Panel}+n_{ID}$.

Next, for the PDSCH/PUSCH DM-RS, a sequence initialization equation including the antenna panel index may be defined/determined in the same principle as above.

$$c_{init}=(2^{C+R+1}(N_{symb}^{slot}n_{s,f}^{\mu}+l+1)(2N_{ID}^{nSCID}+1)g(N^{Panel})+q(N^{Panel},N_{ID}^{nSCID},n_{SCID})) \bmod 2^{L} \quad \text{[Equation 25]}$$

$$c_{init}=(2^{C+R+1}(N_{symb}^{slot}n_{s,f}^{\mu}+l+1)(2N_{ID}^{nSCID}+1)g(N^{Panel})+q(N_{ID}^{nSCID},n_{SCID})) \bmod 2^{L} \quad \text{[Equation 26]}$$

In this case, $g(N^{Panel})$ denotes the function for $N^{Panel}$, and $q(N^{Panel}, N_{ID}^{nSCID}, n_{SCID})$ is the function of $N^{Panel}$, $N_{ID}^{nSCID}$. In the above equation, it may be preferable that $g(N^{Panel})$ becomes an odd number when multiplied with $2N_{ID}^{nSCID}+1$. This is why if the parts multiplied with $2^{L}$ and $g(N^{Panel})$ are coprime, the same sequence initialization value may be generated according to the symbol index, slot index, and scrambling ID value in one frame. Therefore, it may be preferable that $g(N^{Panel})=2N_{ID}^{nSCID}+1$. Additionally, it is apparent that the above-described equation configuration schemes may be similarly extended/applied to PDCCH/PUCCH DMRS, and the equation configurations for PDCCH/PUCCH DMRS may also be included in the methods proposed in the disclosure.

Sequence Initialization Considering CDM Group Index

CSI-RS Sequence Initialization Based on CDM Group Index

As discussed above, CSI-RS sequence initialization may be configured according to the symbol index, slot index, scrambling ID, and the number of symbols constituting the slot. Proposed herein is initializing the CSI-RS sequence as in the following equation considering the CDM group index to map different sequences to the CSI-RS antenna ports transmitted in the same symbol for each of the CSI-RS antenna ports constituting different CDM groups (proposal 5).

$$c_{init}=(2^{M+C}(N_{symb}^{slot}n_{s,f}^{\mu}+l+1)(2n_{ID}+1)+2^{M} \times N_{CDM}+n_{ID}) \bmod 2^{L} \quad \text{[Equation 27]}$$

$$c_{init}=(2^{M+C}(N_{symb}^{slot}n_{s,f}^{\mu}+l+1)(2n_{ID}+1)+2^{C} \times n_{ID}+N_{CDM}) \bmod 2^{L} \quad \text{[Equation 28]}$$

Equations 27 and 28, respectively, correspond to option 1 and option 2 of proposal 5. In this case, parameters included in Equations 27 and 28 of proposal 5 may be defined/configured as follows.

L: means the sequence length bits. For example, the 31 bits gold sequence or length-31 gold sequence is L=31, and in Equations 27 and 28, ( . . . )mod $2^{31}$.

$n_{ID} \in \{0, 1, \ldots, 2^{M}-1\}$: denotes the scrambling ID, and the scrambling ID is expressed in M bits.

$N_{CDM} \in \{0, 1, \ldots, 2^{C}-1\}$: denotes the index of the CDM group and is expressed/configured using C bits to distinguish the CDM groups.

(Proposal #5-1) when L=31 in Equations 27 and 28, for the M+C value not to exceed 19 (that is, M+C≤19) $N_{ID}$ and/or $N_{CDM}$ may be configured/indicated. Further, the M (bits) value used to configure the scrambling ID considering the maximum number of CDM groups for the M+C value not to exceed 19 may be defined/configured.

More specifically, considering the numerology according to subcarrier spacing of the NR system, if M+C exceeds 19, the same $c_{init}$ value may be generated in one frame according to such parameters as OFDM symbol index and slot index. Therefore, allowing M+C not to exceed 19 may prevent the same $c_{init}$ value from being generated in one frame. In other words, it is intended to use/configure/indicate independent sequence initialization values $c_{init}$ different from one another in all the symbols and slots in one frame.

In the above two options (option 1 and option 2), the principle of configuring/defining the sequence initialization equation is similar for the two options. However, when the other factors (symbol index, slot index, and scrambling ID) than the CDM group index in the above equation are set to fixed values, the capability of the sequence generated according to each option may differ considering the initialization sequence value generated according to each option. That is, in the case of option 2, $c_{init}$ which increases as the panel identifier increases by 1 becomes smaller than in the case of option 1. In the case of option 1, the CDM group index and $2^{M}$ are multiplied. Therefore, if M has a value greater than 1, although $c_{init}$ is generated based on the same CDM group index in option 1 and option 2, the $c_{init}$ value determined based on the CDM group index resultantly becomes larger in option 1 than in option 2. In this case, since the CSI-RS scrambling ID bits of NR are 10 bits, it may be assumed that M=10.

If the sequences are individually generated using two sequence initialization values ($c_{init}$) the cross-correlation performance between the two generated sequences is affected by the difference between the initialization values. In general, the greater the difference between the initialization values, the better the cross-correlation performance may be between the two generated sequences. Therefore, to use a sequence with better cross-correlation performance for two sequences generated according to the antenna panel ID value, it may be preferable to generate the sequence by the method for option 1 rather than option 2.

Initialization of DM-RS for PDSCH and/or DM-RS Sequence for PUSCH Based on CDM Group Index As discussed above, PDSCH DMRS and/or PUSCH DMRS sequence initialization may be configured according to the symbol index, slot index, scrambling ID, and the number of symbols constituting the slot. Proposed herein is initializing the PDSCH DM-RS and/or PUSCH DM-RS sequence as in the following equation considering the CDM group index to map different sequences to the CSI-RS antenna ports transmitted in the same symbol for each of the DM-RS antenna ports constituting different CDM groups (proposal 6).

[Equation 29]

$$c_{init} = (2^{C+R+1}(N_{symb}^{slot} n_{s,f}^{\mu} + l + 1)(2N_{ID}^{nSCID} + 1) + 2^{R+1} \times N_{CDM} + 2N_{ID}^{nSCID} + n_{SCID}) \bmod 2^L \quad \text{(option 1)}$$

$$c_{init} = (2^{C+R+1}(N_{symb}^{slot} n_{s,f}^{\mu} + l + 1)(2N_{ID}^{nSCID} + 1) + 2^{C+1} \times N_{ID}^{nSCID} + 2N_{CDM} + n_{SCID}) \bmod 2^L \quad \text{(option 2)}$$

$$c_{init} = (2^{C+R+1}(N_{symb}^{slot} n_{s,f}^{\mu} + l + 1)(2N_{ID}^{nSCID} + 1) + 2^{C+1} \times N_{ID}^{nSCID} + 2^C n_{SCID} + N_{SCID}) \bmod 2^L \quad \text{(option 3)}$$

$$c_{init} = (2^{C+R+1}(N_{symb}^{slot} n_{s,f}^{\mu} + l + 1)(2N_{ID}^{nSCID} + 1) + 2^{R+1} \times N_{CDM} + 2^R n_{SCID} + N_{SCID}) \bmod 2^L \quad \text{(option 4)}$$

$$c_{init} = (2^{C+R+1}(N_{symb}^{slot} n_{s,f}^{\mu} + l + 1)(2N_{ID}^{nSCID} + 1) + 2^{C+R} \times n_{SCID} + 2^R N_{CDM} + N_{SCID}) \bmod 2^L \quad \text{(option 5)}$$

$$c_{init} = (2^{C+R+1}(N_{symb}^{slot} n_{s,f}^{\mu} + l + 1)(2N_{ID}^{nSCID} + 1) + 2^{C+R} \times n_{SCID} + 2^C N_{ID}^{nSCID} + N_{SCID}) \bmod 2^L \quad \text{(option 6)}$$

In this case, parameters included in Equation 29 of proposal 6 may be defined/configured as follows.

L: means the sequence length bits. For example, the 31 bits gold sequence or length-31 gold sequence is L=31, and in Equation 29, ( . . . )mod $2^{31}$.

$N_{ID}^{nSCID} \in \{0, 1, \ldots, 2^R - 1\}$: denotes the scrambling ID, and the scrambling ID is expressed in R bits.

$N_{CDM} \in \{0, 1, \ldots, 2^C - 1\}$: denotes the index of the CDM group and is expressed/configured using C bits to distinguish the CDM groups.

The above-described six options are configured in similar principles but, resultantly, the $c_{init}$ value may vary according to the CDM group index, panel information (or panel identifier), and scrambling ID.

Additionally, the PDSCH DM-RS and/or PUSCH DM-RS sequence initialization method may be used/applied to the PTRS sequence initialization method in the same or a similar manner.

Further, the cross-correlation performance between sequences may be different depending on each of option 1 to option 6.

(Proposal #6-1) when L=31 in Equation 29, for the C+R+1 value not to exceed 19 (that is, C+R≤18) $n_{ID}$ and/or $N_{CDM}$ may be configured/indicated. Further, the R (bits) value used to configure the DM-RS scrambling ID considering the maximum number of CDM groups for the C+R value not to exceed 18 may be defined/configured.

More specifically, considering the numerology according to subcarrier spacing of the NR system, if C+R exceeds 18, the same $c_{init}$ value may be generated in one frame according to such parameters as OFDM symbol index and slot index. Therefore, allowing C+R not to exceed 18 may prevent the same $c_{init}$ value from being generated in one frame. In other words, it is intended to use/configure/indicate independent sequence initialization values $c_{init}$ different from one another in all the symbols and slots in one frame.

As described above in connection with the CSI-RS sequence initialization method considering the CDM group index, it may be preferable to use option 1 with a large difference in sequence initialization value depending on the CDM group index so as to use a sequence with good cross-correlation performance according to the CDM group index.

Initialization of DM-RS for PDCCH and/or DM-RS Sequence for PUCCH Based on CDM Group Index As discussed above, PDCCH DM-RS and/or PUCCH DM-RS sequence initialization may be configured according to the symbol index, slot index, scrambling ID, and the number of symbols constituting the slot. Proposed herein is initializing the PDCCH DM-RS and/or PUCCH DM-RS sequence as in the following equation considering the CDM group index to map different sequences to the CSI-RS antenna ports transmitted in the same symbol for each of the DM-RS antenna ports constituting different CDM groups (proposal 7).

$$c_{init} = (2^{R+C}(N_{symb}^{slot} n_{s,f}^{\mu} + l + 1)(2N_{ID} + 1) + 2^R \times N_{CDM} + 2N_{ID}) \bmod 2^L \quad \text{[Equation 30]}$$

$$c_{init} = (2^{R+C}(N_{symb}^{slot} n_{s,f}^{\mu} + l + 1)(2N_{ID} + 1) + 2^C + 2N_{ID} + \times N_{CDM}) \bmod 2^L \quad \text{[Equation 31]}$$

Equations 30 and 31, respectively, correspond to option 1 and option 2 of proposal 7. In all of the options of Equation 30 and Equation 31 above, "2 $N_{ID}$" behind the $2^{R+C}(N_{symb}^{slot} n_{s,f}^{\mu} + l + 1)(2N_{ID} + 1)$ term may be defined/configured/indicated as "$N_{ID}$" except for 2. This is why if it is not the case where a parameter corresponding to one bit comes after 2 $N_{ID}$, it is not needed to multiply $N_{ID}$ by 2 and, if multiplied by 2, a loss of one bit may be caused depending on the allocation scheme.

The parameters included in Equations 30 and 31 may be defined/configured as follows.

L: means the sequence length bits. For example, the 31 bits gold sequence or length-31 gold sequence is L=31, and in Equations 30 and 31, ( . . . )mod $2^{32}$.

$N_{ID} \in \{0, 1, \ldots, 2^R - 1\}$: denotes the scrambling ID, and the scrambling ID is expressed in R bits.

$N_{CDM} \in \{0, 1, \ldots, 2^C - 1\}$: denotes the index of the CDM group and is expressed/configured using C bits to distinguish the CDM groups.

Additionally, the PDCCH DM-RS and/or PUCCH DM-RS sequence initialization method may be used/applied to the PTRS sequence initialization method in the same or a similar manner.

(Proposal #7-1) when L=31 in Equations 30 and 31, for the R+C value not to exceed 19 (that is, R+C≤19) $n_{ID}$ and/or $N_{CDM}$ may be configured/indicated.

More specifically, considering the numerology according to subcarrier spacing of the NR system, if R+C exceeds 19, the same $c_{init}$ value may be generated in one frame according to such parameters as OFDM symbol index and slot index. Therefore, allowing R+C not to exceed 19 may prevent the same $c_{init}$ value from being generated in one frame. In other words, it is intended to use/configure/indicate independent sequence initialization values $c_{init}$ different from one another in all the symbols and slots in one frame.

Additionally, in each of the options of the above proposals, a difference in performance of the generated sequence may occur according to the option. A difference in cross-correlation performance between the sequences may occur depending on how it is reflected in the sequence initialization equation of CSI-RS/DM-RS.

First, in the equations (equation 8 or equation 12) in which the CDM group index is not considered, the CSI-RS/DM-RS sequence initialization equation may be divided into a part multiplied with $(2n_{ID}+1)$ and another part which is added to the $(2n_{ID}+1)$-multiplied part. That is, unlike the options of proposals 5 to 7 discussed above, if the CDM group index is reflected to the part multiplied with $(2n_{ID}+1)$, it is possible to make the difference in sequence initialization value according to the CDM group index larger.

For example, a CSI-RS sequence equation including the CDM group index may be defined/determined/configured as follows.

$$c_{init}=(2^{M+C}(N_{symb}^{slot}n_{s,f}^{\mu}+l+1)(2N_{ID}+1)(2N_{CDM}+1)+\\2^M\times N_{CDM}+n_{ID})\bmod 2^L \quad \text{[Equation 32]}$$

$$c_{init}=(2^{M+C}(N_{symb}^{slot}n_{s,f}^{\mu}+l+1)(2N_{ID}+1)\times g(N_{CDM})+q\\(N_{CDM},n_{ID}))\bmod 2^L \quad \text{[Equation 33]}$$

$$c_{init}=(2^{M+C}(N_{symb}^{slot}n_{s,f}^{\mu}+l+1)(2N_{ID}+1)\times g\\(N_{CDM})+n_{ID}))\bmod 2^L \quad \text{[Equation 34]}$$

In this case, $g(N_{CDM})$ and $q(N_{CDM}, n_{ID})$, respectively, are the function for $N_{CDM}$ and the function for $N_{CDM}, n_{ID}$. For example, $q(N_{CDM}, n_{ID})$ may be most simply determined to be $2^M \times N_{CDM}+n_{ID}$.

Next, for the PDSCH/PUSCH DM-RS, a sequence initialization equation including the CDM group index may be defined/determined in the same principle as above.

$$c_{init}=(2^{M+C}(N_{symb}^{slot}n_{s,f}^{\mu}+l+1)(2N_{ID}^{nSCID}+1)g(N_{CDM})+\\q(N_{CDM},N_{ID}^{nSCID},n_{SCID}))\bmod 2^L \quad \text{[Equation 35]}$$

$$c_{init}=(2^{C+R+1}(N_{symb}^{slot}n_{s,f}^{\mu}+l+1)(2N_{ID}^{nSCID}+1)g\\(N^{CDM})+q(N_{ID}^{nSCID},n_{SCID}))\bmod 2^L \quad \text{[Equation 36]}$$

In this case, $g(N_{CDM})$ denotes the function for $N_{CDM}$, and $q(N_{CDM},N_{ID}^{nSCID},n_{SCID})$ is the function of $N_{CDM},N_{ID}^{nSCID}$, $n_{SCID}$.

In the above equation, it may be preferable that $g(N_{CDM})$ becomes an odd number when multiplied with $2N_{ID}^{nSCID}+1$. This is why if the parts multiplied with $2^L$ and $g(N_{CDM})$ are coprime, the same sequence initialization value may be generated according to the symbol index, slot index, and scrambling ID value in one frame. Therefore, it may be preferable that $g(N_{CDM})=2N_{CDM}+1$.

To define/determine a CSI-RS/DM-RS sequence initialization equation including the CDM group index, three options may be considered.

First, the CDM group index may be included in the linear terms of the DM-RS sequence initialization equation. Second, the CDM group index may be included in the nonlinear terms. Finally, the CDM group index may be included in both the linear terms and nonlinear terms.

Given cross-correlation performance, the second and third options may be preferable to the first option. This is because when sequence initialization is performed based on the second and third options, the difference in sequence initialization values according to other CDM group indexes becomes larger than the value of the first option. It may also be preferable to multiply the CDM group index (or related term) by a nonlinear term to reduce cross-correlation.

Sequence Initialization Considering CDM Group Index and Multiple UE Tx/Rx Panels Described below is a method for initializing a reference signal sequence considering both multi-UE transmission/reception panel information and CDM group information. The multi-UE transmission/reception panel information may include a panel identifier and may be expressed as 'panel identifier information' or 'panel identifier'.

CSI-RS Sequence Initialization Based on CDM Group Index and Multi-UE Transmission/Reception Panel Proposed herein is a method for initializing the CSI-RS sequence considering the transmission/reception panel information for the UE and the CDM group index (proposal 8).

According to the following equation, a method for initializing a CSI-RS sequence considering transmission/reception panel information and the CDM group index may be performed.

[Equation 37]

$$c_{init}=(2^{M+N+C}(N_{symb}^{slot}n_{s,f}^{\mu}+l+1)(2N_{ID}+1)+\\2^{M+N}\cdot N_{CDM}+2^M\cdot N^{Panel}+n_{ID})\bmod 2^L \quad \text{(option 1)}$$

$$c_{init}=(2^{M+N+C}(N_{symb}^{slot}n_{s,f}^{\mu}+l+1)(2N_{ID}+1)+\\2^{M+C}\cdot N^{Panel}+2^M\cdot N_{CDM}+n_{ID})\bmod 2^L \quad \text{(option 2)}$$

$$c_{init}=(2^{M+N+C}(N_{symb}^{slot}n_{s,f}^{\mu}+l+1)(2N_{ID}+1)+\\2^{M+C}\cdot N^{Panel}+2^C\cdot n_{ID}+N_{CDM})\bmod 2^L \quad \text{(option 3)}$$

$$c_{init}=(2^{M+N+C}(N_{symb}^{slot}n_{s,f}^{\mu}+l+1)(2N_{ID}+1)+\\2^{M+N}\cdot N_{CDM}+2^N\cdot n_{ID}+N_{RX}^{Panel})\bmod 2^L \quad \text{(option 4)}$$

$$c_{init}=(2^{M+N+C}(N_{symb}^{slot}n_{s,f}^{\mu}+l+1)(2N_{ID}+1)+2^{M+C}\cdot N_{ID}+\\2^N\cdot N_{CDM}+N^{Panel})\bmod 2^L \quad \text{(option 5)}$$

$$c_{init}=(2^{M+N+C}(N_{symb}^{slot}n_{s,f}^{\mu}+l+1)(2N_{ID}+1)+2^{M+N}\cdot N_{ID}+\\2^M\cdot N^{Panel}+N_{CDM})\bmod 2^L \quad \text{(option 6)}$$

In Equation 37, the options are configured in similar principles but, as a result, the $c_{init}$ value (initialization value) may vary according to the CDM group index, transmission/reception panel information, and scrambling ID.

The parameters included in Equation 37 may be defined/configured as follows.

L: means the sequence length bits. For example, the 31 bits gold sequence or length-31 gold sequence is L=31, and in Equation 37, ( ... )mod $2^{31}$.

$n_{ID} \in \{0, 1, \ldots, 2^M-1\}$: denotes the scrambling ID, and the scrambling ID is expressed in M bits.

$N^{Panel} \in \{0, 1, \ldots 2^N-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

$N_{CDM} \in \{0, 1, \ldots, 2^C-1\}$: denotes the index of the CDM group and is expressed/configured using C bits to distinguish the CDM groups.

(Proposal #8-1) when L=31 in Equation 37, for the M+N+C value not to exceed 19 (that is, M+N+C≤19) $n_{ID}$ and/or $N^{Panel}$ and/or $N_{CDM}$ may be configured/indicated/defined. And/or, M and/or N and/or C may be configured/indicated/defined so that the M+N+C value does not exceed 19.

More specifically, considering the numerology according to subcarrier spacing of the NR system, if M+N+C exceeds 19, the same $c_{init}$ value may be generated in one frame according to such parameters as OFDM symbol index and slot index. Therefore, allowing M+N+C not to exceed 19 may prevent the same $c_{init}$ value from being generated in one frame. In other words, it is intended to use/configure/indicate independent sequence initialization values $c_{init}$ different from one another in all the symbols and slots in one frame.

Initialization of PDSCH DM-RS and/or PUSCH DM-RS Sequence Considering Transmission/Reception Panel Information and CDM Group Index Proposed herein is a method for initializing the DM-RS sequence considering the transmission/reception panel information for the UE and the CDM group index (proposal 9).

According to the following equation, a method for initializing a DM-RS sequence considering transmission/reception panel information and the CDM group index may be performed.

[Equation 38]

$$c_{init} = (2^{N+C+R+1}(N_{symb}^{slot}n_{s,f}^u + l + 1)(2N_{ID}^{n_{SCID}} + 1) +$$
$$2^{C+R+1}N^{Panel} + 2^{R+1}N_{CDM} + 2N_{ID}^{n_{SCID}} + n_{SCID})$$
$$\mod 2^L \quad \text{(option 1)}$$

$$c_{init} = (2^{N+C+R+1}(N_{symb}^{slot}n_{s,f}^{slot} + l + 1)(2N_{ID}^{n_{SCID}} + 1) +$$
$$2^{N+R+1}N_{CDM} + 2^{R+1}N^{Panel} + 2N_{ID}^{n_{SCID}} + n_{SCID})$$
$$\mod 2^L \quad \text{(option 2)}$$

$$c_{init} = (2^{N+C+R+1}(N_{symb}^{slot}n_{s,f}^u + l + 1)(2N_{ID}^{n_{SCID}} + 1) +$$
$$2^{N+R+1}N_{CDM} + 2^{N+1}N_{ID}^{n_{SCID}} + 2N^{Panel} + n_{SCID})$$
$$\mod 2^L \quad \text{(option 3)}$$

$$c_{init} = (2^{N+C+R+1}(N_{symb}^{slot}n_{s,f}^u + l + 1)(2N_{ID}^{n_{SCID}} + 1) +$$
$$2^{N+C+1}N_{ID}^{n_{SCID}} + 2^{N+1}N_{CDM} + 2N^{Panel} + n_{SCID})$$
$$\mod 2^L \quad \text{(option 4)}$$

$$c_{init} = (2^{N+C+R+1}(N_{symb}^{slot}n_{s,f}^u + l + 1)(2N_{ID}^{n_{SCID}} + 1) +$$
$$2^{N+C+1}N_{ID}^{n_{SCID}} + 2^{C+1}N^{Panel} + 2N_{CDM} + n_{SCID})$$
$$\mod 2^L \quad \text{(option 5)}$$

$$c_{init} = (2^{N+C+R+1}(N_{symb}^{slot}n_{s,f}^u + l + 1)(2N_{ID}^{n_{SCID}} + 1) +$$
$$2^{R+C+1}N^{Panel} + 2^{C+1}N_{ID}^{n_{SCID}} + 2N_{CDM} + n_{SCID})$$
$$\mod 2^L \quad \text{(option 6)}$$

⋮

$$c_{init} = (2^{N+C+R+1}(N_{symb}^{slot}n_{s,f}^u + l + 1)(2N_{ID}^{n_{SCID}} + 1) +$$
$$2^{N+R+C}n_{SCID} + 2^{N+C}N_{ID}^{n_{SCID}} +$$
$$2^N N_{CDM} + N^{Panel}) \mod 2^L \quad \text{(option 24)}$$

Equation 38 includes a total of 24 options that may be configured in the same principle. The 24 options are varied in order of $N_{ID}^{n_{SCID}}$, $N_{CDM}$, $N^{Panel}$, $n_{SCID}$ expanded behind $2^{N+C+R+1}(N_{symb}^{slot}n_{s,f}^u+l+1)(2N_{ID}^{n_{SCID}}+1)$, and 24 options of proposal 9 are configured in a manner similar to options 1 to 6 of proposal 8 described above. Although all of the 24 types are not specified in Equation 38, the reference signal sequence initialization method proposed in the disclosure may include the options not specified in Equation 38. The parameters included in Equation 38 may be defined/configured as follows.

L: means the sequence length bits. For example, the 31 bits gold sequence or length-31 gold sequence is L=31, and in Equation 38, ( . . . )mod $2^{31}$.

$N_{ID}^{n_{SCID}} \in \{0, 1, \ldots, 2^R-1\}$: denotes the scrambling ID, and the scrambling ID is expressed in R bits.

$N^{Panel} \in \{0, 1, \ldots 2^N-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

$N_{CDM} \in \{0, 1, \ldots, 2^C-1\}$: denotes the index of the CDM group and is expressed/configured using C bits to distinguish the CDM groups.

Additionally, the PDSCH DM-RS and/or PUSCJ DM-RS sequence initialization method may be used/applied to the PTRS sequence initialization method in the same or a similar manner.

(Proposal #9-1) when L=31 in Equation 38, for the N+C+R+1 value not to exceed 19 (that is, N+C+R≤18) $N_{ID}^{n_{SCID}}$ and/or $N_{RX}^{Panel}$ and/or $N_{CDM}$ may be configured/indicated. The R (bits) value used to configure the DM-RS scrambling ID considering the maximum number of CDM groups and/or the number of RX/TX panels of the UE for the N+C+R value not to exceed 19 may be defined/configured/reconfigured/varied.

More specifically, considering the numerology according to subcarrier spacing of the NR system, if N+C+R+1 exceeds 19, the same $c_{init}$ value may be generated in one frame according to such parameters as OFDM symbol index and slot index. Therefore, allowing N+C+R+1 not to exceed 19 may prevent the same $c_{init}$ value from being generated in one frame. In other words, it is intended to use/configure/indicate independent sequence initialization values $c_{init}$ different from one another in all the symbols and slots in one frame.

In the Type II DM-RS of the NR system, such a case may be considered where one bit is used in $n_{SCID}$, and the scrambling ID ($N_{ID}^{n_{SCID}}$) is 16 bits (R=16) and the total number of CDM groups is four (C=2). In this case, since C+R+1=19, N+C+R+1 always exceeds 19 even when N=1. In this case, N+C+R+1 may be prevented from exceeding 19 through the following method.

For a UE equipped with multiple transmission/reception panels, the base station may configure/indicate the scrambling ID ($N_{ID}^{n_{SCID}}$) to be 16 bits or less.

Further, for a UE equipped with multiple transmission/reception panels, the base station does not use one bit for $n_{SCID}$ allocation, and the one bit may be used to initialize the sequence considering the two panels of the UE. In this case, the UE equipped with multiple transmission/reception panels may automatically recognize that the one bit is not used for $n_{SCID}$ allocation. Alternatively, the base station may configure/indicate this to the UE. That is, the base station and the UE initialize and use the sequence with an equation which is Equation 38 without $n_{SCID}$.

Alternatively, the UE may allow the base station to recognize that the UE is equipped with one or more multiple transmission/reception panels via RRC signaling indicating UE capability. In this case, even when the base station recognizes that the UE is equipped with one or more multiple transmission/reception panels, the base station may perform sequence initialization without considering multiple panels as the UE having a single panel as a default operation.

Initialization of PDCCH DMRS and/or PUCCH DMRS Sequence Considering Transmission/Reception Panel Information and CDM Group Index Proposed herein is a method for initializing the DM-RS sequence considering the transmission/reception panel information for the UE and the CDM group index (proposal 10).

According to the following equation, a method for initializing a DM-RS sequence considering transmission/reception panel information and the CDM group index may be performed.

[Equation 39]

$$c_{init} = (2^{N+R+C}(N_{symb}^{slot}n_{s,f}^u+l+1)(2N_{ID}+1)+2^{N+R} \times$$
$$N_{CDM}+2^N \times 2N_{ID}+N^{Panel}) \mod 2^L \quad \text{(option 1)}$$

$$c_{init} = (2^{N+R+C}(N_{symb}^{slot}n_{s,f}^u+l+1)(2N_{ID}+1)+2^{N+C} \times$$
$$2N_{ID}+2^N \times N_{CDM}+N^{Panel}) \mod 2^L \quad \text{(option 2)}$$

$$c_{init}=(2^{N+R+C}(N_{symb}^{slot}n_{s,f}^{\mu}+l+1)(2N_{ID}+1)+2^{N+C}\times \\ 2N_{ID}+2^{C}\times N^{Panel}+N_{CDM})\bmod 2^{L} \quad \text{(option 3)}$$

$$c_{init}=(2^{N+R+C}(N_{symb}^{slot}n_{s,f}^{\mu}+l+1)(2N_{ID}+1)+2^{N+R}\times \\ N_{CDM}+2^{R}\times N^{Panel}+2N_{ID})\bmod 2^{L} \quad \text{(option 4)}$$

$$c_{init}=(2^{N+R+C}(N_{symb}^{slot}n_{s,f}^{\mu}+l+1)(2N_{ID}+1)+2^{C+R}\times \\ N^{Panel}+2^{C}\times 2N_{ID}+N_{CDM})\bmod 2^{L} \quad \text{(option 5)}$$

$$c_{init}=(2^{N+R+C}(N_{symb}^{slot}n_{s,f}^{\mu}+l+1)(2N_{ID}+1)+2^{C+R}\times \\ N^{Panel}+2^{N}\times 2N_{CDM}+2N_{ID})\bmod 2^{L} \quad \text{(option 6)}$$

In Equation 39, the options are configured in similar principles but, as a result, the $c_{init}$ value (initialization value) may vary according to the CDM group index, transmission/reception panel information, and scrambling ID.

In all of the options of Equation 39 above, "2 $N_{ID}$" behind the $2^{N+R+1}(N_{symb}^{slot}n_{s,f}^{\mu}+l+1)(2N_{ID}+1)$ term may be defined/configured/indicated as "$N_{ID}$" except for 2. This is why if it is not the case where a parameter corresponding to one bit comes after 2 $N_{ID}$, it is not needed to multiply $N_{ID}$ by 2 and, if multiplied by 2, a loss of one bit may be caused depending on the allocation scheme.

The parameters included in Equation 39 may be defined/configured as follows.

L: means the sequence length bits. For example, the 31 bits gold sequence or length-31 gold sequence is L=31, and in Equation 38, ( . . . )mod $2^{31}$.

$N_{ID} \in \{0, 1, \ldots, 2^{R}-1\}$: denotes the scrambling ID, and the scrambling ID is expressed in R bits.

$N_{CDM} \in \{0, 1, \ldots, 2^{C}-1\}$: denotes the index of the CDM group and is expressed/configured using C bits to distinguish the CDM groups.

$N^{Panel} \in \{0, 1, \ldots 2^{N}-1\}$: denotes the UE's transmission/reception (TX/RX) panel information. The transmission/reception panel information may be expressed/configured using N bits. In particular, the panel transmission/reception panel information may include the UE's panel ID. Further, the panel identifier may be the ID of a specific reference signal set or a specific reference signal (or antenna) port/resource (group/set) ID.

Additionally, the PDCCH DM-RS and/or PUCCH DM-RS sequence initialization method may be used/applied to the PTRS sequence initialization method in the same or a similar manner.

(Proposal #10-1) when L=31 in Equation 39, for the N+R+C value not to exceed 19 (that is, N+R+C≤19) $n_{ID}$ and/or $N_{CDM}$ and/or $N^{Panel}$ may be configured/indicated.

More specifically, considering the numerology according to subcarrier spacing of the NR system, if N+R+C exceeds 19, the same $c_{init}$ value may be generated in one frame according to such parameters as OFDM symbol index and slot index. Therefore, allowing N+R+C not to exceed 19 may prevent the same $c_{init}$ value from being generated in one frame. In other words, it is intended to use/configure/indicate independent sequence initialization values $c_{init}$ different from one another in all the symbols and slots in one frame.

In the case of performing panel-wise measurement of the UE, the UE may receive configuration information related to the measurement from the base station.

More specifically, the UE may receive measurement restriction configuration information to perform, e.g., CSI measurement and/or RSRP measurement only on a specific reception (RX) panel(s) of the UE for a specific CSI-RS resource and/or CSI-RS resource sets from the base station.

Alternatively, the UE may receive, from the base station, configuration information to restrict the number of reception panels or the number of reception beams to be used when performing measurement.

Or, the UE may receive, from the base station, configuration information that allows L1-RSRP reporting for a specific CSI-RS resource set to be performed via the UE's specific reception panel in the reporting setting connected with a specific CSI-RS resource and/or CSI-RS resource set.

FIG. 12 is a diagram illustrating an example of a terminal operation performing the method proposed in the disclosure as described above.

That is, FIG. 12 shows an operation of a terminal for transmitting a reference signal in a wireless communication system.

First, the terminal receives, from a base station, control information including panel identification information related to identification of a plurality of antenna panels used for transmission of the reference signal (S1210).

Wherein, the panel identification information may include at least one of a panel index for the plurality of antenna panels, a reference signal set identifier (ID), or a reference signal resource ID for a resource through which the reference signal is transmitted.

Next, the terminal initializes a reference signal sequence used to generate the reference signal based on the panel identification information (S1220).

Wherein, the reference signal sequence may be initialized by further using a code division multiplexing (CDM) group index.

Lastly, the terminal transmits the reference signal to the base station based on the initialized reference signal sequence (S1230).

Wherein, the reference signal may be one of a sounding reference signal (SRS), a physical uplink control channel dedicated demodulation reference signal (PUCCH DM-RS), a physical uplink shared channel (PUSCH) DM-RS or a Positioning Reference Signal (PRS).

Wherein, when transmitting a plurality of reference signals through the plurality of antenna panels, same scrambling sequence identifier (ID) may be set to initialize each reference signal sequence for the plurality of reference signals, and each of the reference signal sequences may be initialized to a different initialization sequence value based on the panel identification information.

At this time, wherein, an antenna panel transmitting a specific reference signal among the plurality of reference signals may be identified based on the panel identification information.

Also, wherein an uplink resource through which the reference signal is transmitted may be shared between the plurality of antenna panels.

Additionally, the terminal may transmit capability information related to the plurality of antenna panels to the base station.

Also, the terminal may receiving resource information for transmission of the reference signal from the base station.

Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 13 illustrates a communication system applied to the disclosure.

Referring to FIG. 13, a communication system applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1410a, vehicles 1410b-1 and 1410b-2, an eXtended Reality (XR) device 1410c, a hand-held device 1410d, a home appliance 1410e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 1420a may operate as a BS/network node with respect to other wireless devices.

The wireless devices 1410a to 100f may be connected to the network 300 via the BSs 1420. An AI technology may be applied to the wireless devices 1410a to 100f and the wireless devices 1410a to 100f may be connected to the AI server 400 via the network 300. The network 300 may be configured using a 3G network, a 4G (e.g., LTE) network, or a 5G (e.g., NR) network. Although the wireless devices 1410a to 100f may communicate with each other through the BSs 1420/network 300, the wireless devices 1410a to 100f may perform direct communication (e.g., sidelink communication) with each other without passing through the BSs/network. For example, the vehicles 1410b-1 and 1410b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1410a to 100f.

Wireless communication/connections 150a, 150b, or 150c may be established between the wireless devices 1410a to 100f/BS 1420, or BS 1420/BS 1420. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Devices Applicable to the Disclosure

FIG. 14 illustrates wireless devices applicable to the disclosure.

Referring to FIG. 14, a first wireless device 1410 and a second wireless device 1420 may transmit radio signals through a variety of RATs (e.g., LTE and NR). Herein, {the first wireless device 1410 and the second wireless device 1420} may correspond to {the wireless device 1410x and the BS 1420} and/or {the wireless device 1410x and the wireless device 1410x} of FIG. 13.

The first wireless device 1410 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 1420 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 1410 and 1420 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Disclosure is Applied

FIG. 15 illustrates a signal processing circuit for a transmit signal.

Referring to FIG. 15, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 15 may be performed by the processors 102 and 202 and/or the transceivers 106 and 206 of FIG. 14. Hardware elements of FIG. 15 may be implemented in the processors 102 and 202 and/or the transceivers 106 and 206 of FIG. 14. For example, blocks 2010 to 2060 may be implemented in the processors 102 and 202 of FIG. 14. Further, blocks 2010 to 2050 may be implemented in the processors 102 and 202 of FIG. 14 and the block 2060 of FIG. 14 and the block 2060 may be implemented in the transceivers 106 and 206 of FIG. 14.

A codeword may be transformed into a radio signal via the signal processing circuit 2000 of FIG. 15. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 28. For example, the wireless device (e.g., 100 or 200 of FIG. 21) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 16 illustrates another example of a wireless device applied to the disclosure. The wireless device may be implemented in various forms according to a use-case/service (refer to FIG. 13).

Referring to FIG. 16, wireless devices 1410 and 1420 may correspond to the wireless devices 1410 and 1420 of FIG. 14 and may be configured by various elements, components, units/portions, and/or modules. For example, each of the wireless devices 1410 and 1420 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 14. For example, the transceiver(s) 114 may include the one or more transceivers 106 and 106 and/or the one or more antennas 108 and 108 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1410a of FIG. 13), the vehicles (1410b-1 and 1410b-2 of FIG. 13), the XR device (1410c of FIG. 13), the hand-held device (1410d of FIG. 13), the home appliance (1410e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (1420 of FIG. 13), a network node, etc. The wireless device may be used in a mobile or fixed place according to a use-example/service.

In FIG. 16, the entirety of the various elements, components, units/portions, and/or modules in the wireless devices 1410 and 1420 may be connected to each other through a wired interface or at least a part thereof may be wirelessly connected through the communication unit 110. For example, in each of the wireless devices 1410 and 1420, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 1420 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an implementation example of FIG. 16 will be described in more detail with reference to the drawings.

Portable Device Example to which Disclosure is Applied

FIG. 17 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 17, a portable device 1410 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 16, respectively.

The communication unit 110 may transmit/receive a signal (e.g., data, a control signal, etc.) to/from another wireless device and eNBs. The control unit 120 may perform various operations by controlling components of the portable device 1410. The control unit 120 may include an Application Processor (AP). The memory unit 130 may store data/parameters/programs/codes/instructions required for driving the portable device 1410. Further, the memory unit 130 may store input/output data/information, etc. The power supply unit 140a may supply power to the portable device 1410 and include a wired/wireless charging circuit, a battery, and the like. The interface unit 140b may support a connection between the portable device 1410 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

The method for transmitting a highly reliable uplink signal in the wireless communication system of the disclosure has been described mainly in an example applied to a 3GPP NR system, but it can be applied to various wireless communication systems in addition to the 3GPP NR system.

The invention claimed is:

1. A method of transmitting a reference signal in a wireless communication system, performed by a terminal, the method comprising:
    receiving, from a base station, a synchronization signal;
    receiving, from the base station, a physical broadcast channel (PBCH);
    receiving, from the base station, control information,
    wherein the control information includes panel identification information related to identification of a plurality of antenna panels related to transmission of the reference signal;
    initializing a reference signal sequence related to generating the reference signal based on the panel identification information; and
    transmitting the reference signal to the base station based on the initialized reference signal sequence,
    wherein, based on a plurality of reference signals being transmitted through the plurality of antenna panels, a same scrambling sequence identifier (ID) is set to initialize each reference signal sequence for the plurality of reference signals, and wherein each reference signal sequence is initialized to a different initialization sequence value based on the panel identification information.

2. The method of claim 1,
wherein the reference signal is one of a sounding reference signal (SRS), a physical uplink control channel dedicated demodulation reference signal(PUCCH DM-RS), a physical uplink shared channel(PUSCH) DM-RS or a Positioning Reference Signal(PRS).

3. The method of claim 1,
wherein the panel identification information includes at least one of a panel index for the plurality of antenna panels, a reference signal set identifier (ID), or a reference signal resource ID for a resource through which the reference signal is transmitted, and
wherein each of the plurality of antenna panels comprises a plurality of antenna ports.

4. The method of claim 1,
wherein the reference signal sequence is initialized by further using a code division multiplexing (CDM) group index.

5. The method of claim 1,
wherein an antenna panel configured to transmit a specific reference signal among the plurality of reference signals is identified based on the panel identification information.

6. The method of claim 1,
wherein an uplink resource through which the reference signal is transmitted is shared between the plurality of antenna panels.

7. The method of claim 1, further comprising:
transmitting capability information related to the plurality of antenna panels to the base station.

8. The method of claim 1, further comprising:
receiving resource information for transmission of the reference signal from the base station.

9. A method of transmitting a reference signal in a wireless communication system, performed by a base station, the method comprising:
transmitting, to a terminal, control information,
wherein the control information includes panel identification information related to identification of a plurality of antenna panels related to transmission of the reference signal,
wherein a reference signal sequence related to generating the reference signal is initialized based on the panel identification information by the terminal; and
receiving, from the terminal, the reference signal generated based on the initialized reference signal sequence by the terminal,
wherein, based on a plurality of reference signals being received through the plurality of antenna panels, a same scrambling sequence identifier (ID) is set to initialize each reference signal sequence for the plurality of reference signals, and
wherein each reference signal sequence is initialized to a different initialization sequence value based on the panel identification information.

10. A terminal configured to transmit a reference signal in a wireless communication system, comprising:
a transmitter configured to transmit a radio signal;
a receiver configured to receive a radio signal; and
a processor functionally connected to the transmitter and the receiver,
wherein the processor is configured to:
control the receiver to receive, from a base station, control information including panel identification information related to identification of a plurality of antenna panels related to transmission of the reference signal,
initialize a reference signal sequence related to generating the reference signal based on the panel identification information, and
control the transmitter to transmit the reference signal to the base station based on the initialized reference signal sequence,
wherein, based on a plurality of reference signals being transmitted through the plurality of antenna panels, a same scrambling sequence identifier (ID) is set to initialize each reference signal sequence for the plurality of reference signals, and
wherein each reference signal sequence is initialized to a different initialization sequence value based on the panel identification information.

11. The terminal of claim 10,
wherein the reference signal is one of a sounding reference signal (SRS), a physical uplink control channel dedicated demodulation reference signal(PUCCH DM-RS), a physical uplink shared channel(PUSCH) DM-RS or a Positioning Reference Signal(PRS).

12. The terminal of claim 10,
wherein the panel identification information includes at least one of a panel index for the plurality of antenna panels, a reference signal set identifier (ID), or a reference signal resource ID for a resource through which the reference signal is transmitted, and
wherein each of the plurality of antenna panels comprises a plurality of antenna ports.

13. The terminal of claim 10,
wherein the reference signal sequence is initialized by further using a code division multiplexing (CDM) group index.

14. The terminal of claim 10,
wherein an antenna panel is configured to transmit transmitting a specific reference signal among the plurality of reference signals is identified based on the panel identification information.

15. The terminal of claim 10,
wherein an uplink resource through which the reference signal is transmitted is shared between the plurality of antenna panels.

16. The terminal of claim 10,
wherein the processor is further configured to control:
the transmitter to transmit capability information related to the plurality of antenna panels to the base station.

17. The terminal of claim 10,
wherein the processor is further configured to control:
the receiver to receive resource information for transmission of the reference signal from the base station.

* * * * *